(12) United States Patent
Plante et al.

(10) Patent No.: US 10,073,442 B2
(45) Date of Patent: Sep. 11, 2018

(54) INTELLIGENT THERMAL VALIDATION AND MONITORING SYSTEM WITH ASSET MANAGEMENT AND SELF DIAGNOSIS CAPABILITIES

(71) Applicant: Amphenol Thermometrics, Inc., St. Marys, PA (US)

(72) Inventors: Dennis Plante, Billerica, MA (US); Frank Kies, Straubenhardt (DE); Himangshu Chowdhury, Hyderabad (IN); Volker Luebcke, Gundelbach (DE)

(73) Assignee: Amphenol Thermometrics, Inc., Saint Marys, PA (US)

( * ) Notice: Subject to any disclaimer, the term of this patent is extended or adjusted under 35 U.S.C. 154(b) by 195 days.

(21) Appl. No.: 15/072,783

(22) Filed: Mar. 17, 2016

(65) Prior Publication Data
US 2016/0274559 A1    Sep. 22, 2016

(30) Foreign Application Priority Data

Mar. 17, 2015 (IN) .............................. 731/DEL/2015
Apr. 18, 2015 (IN) ........................... 1088/DEL/2015

(51) Int. Cl.
*G05B 9/02* (2006.01)
*G05B 19/418* (2006.01)

(52) U.S. Cl.
CPC ...... *G05B 19/4184* (2013.01); *G05B 2219/11* (2013.01); *G05B 2219/37431* (2013.01); *Y02P 90/14* (2015.11)

(58) Field of Classification Search
CPC ............................ G05B 19/4184; Y02P 90/14
See application file for complete search history.

(56) References Cited

U.S. PATENT DOCUMENTS

| | | | |
|---|---|---|---|
| 2003/0062888 A1* | 4/2003 | Magliocco ....... | G01R 31/31903 324/750.08 |
| 2005/0251798 A1* | 11/2005 | Fraley ...................... | G06F 8/65 717/168 |
| 2006/0117377 A1 | 6/2006 | Frenkiel et al. | |

(Continued)

OTHER PUBLICATIONS

GE "Sensing & Inspection Technologies" 2009.*
Written Opinion and Search Report for PCT/US16/22966 dated Jun. 10, 2016 (10 pages).

*Primary Examiner* — Vincent Tran
(74) *Attorney, Agent, or Firm* — Blank Rome LLP

(57) ABSTRACT

A system for qualifying a process in a facility. The system includes a validation system and a portable computer device. The validation system includes a storage device, a processing device, and one or more sensor input modules each connected to one or more sensors. The portable computer device includes a storage device and a processing device. The storage device of the portable computer device includes a database comprising configuration file for configuring the validation system to perform a qualification of the asset. The processing device of the portable computer device is configured to transmit the configuration file to the validation system for storage in the storage device thereof. The processing device of the validation system is configured to load the configuration file stored in the storage device thereof and to perform the qualification of the asset based on the loaded configuration file.

32 Claims, 22 Drawing Sheets

(56) References Cited

U.S. PATENT DOCUMENTS

| | | |
|---|---|---|
| 2006/0282735 A1* | 12/2006 | Weinraub ......... G01R 31/31905 714/742 |
| 2012/0310397 A1 | 12/2012 | Rataul |
| 2013/0080293 A1 | 3/2013 | Khin et al. |
| 2013/0321131 A1 | 12/2013 | Tucker et al. |
| 2014/0181491 A1* | 6/2014 | Kakolaki .............. G06F 9/4411 713/2 |
| 2017/0141764 A9* | 5/2017 | Sehgal ................... H03K 3/013 |

* cited by examiner

FIG. 4B

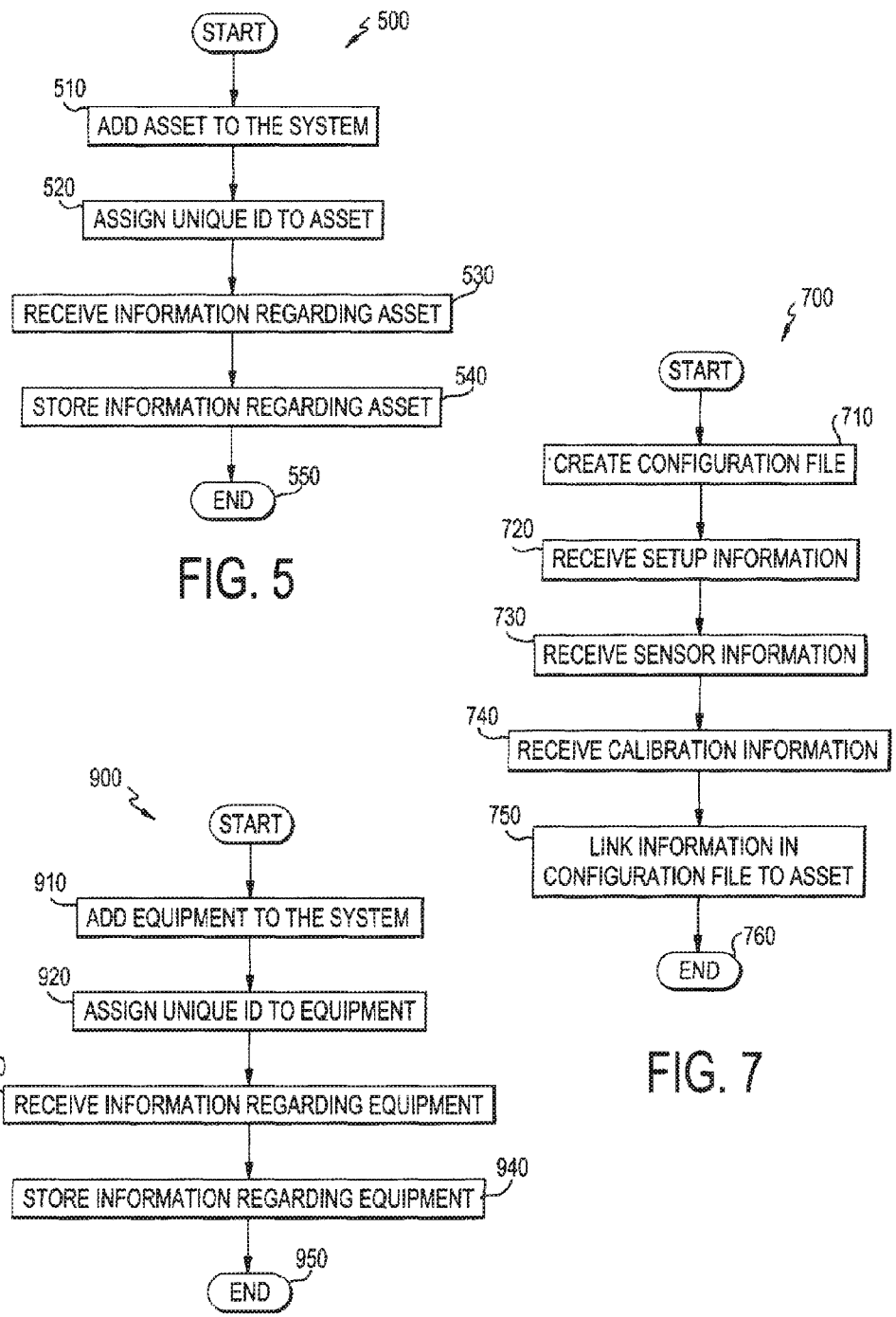

INTELLIGENT THERMAL VALIDATION AND MONITORING SYSTEM WITH ASSET MANAGEMENT AND SELF DIAGNOSIS CAPABILITIES

CROSS REFERENCE TO RELATED APPLICATIONS

This application claims the benefit of Indian Application No. 1088/DEL/2015 filed Apr. 18, 2015 and Indian Provisional Patent Application 731/DEL/2015 filed Mar. 17, 2015, both entitled "Intelligent Thermal Validation & Monitoring System with Asset Management and Self Diagnosis Capabilities." The entire contents of those applications are incorporated herein by reference.

BACKGROUND OF THE INVENTION

A validator is a device that enables users to monitor and validate the safety of their important processes and/or applications, such as pharmaceutical, biotechnology, and medical device manufacturing processes. Monitoring and validating the safety of a process and/or application is known as "qualification." An example of a specific qualification procedure is monitoring and validating temperatures in a sterilization process in a medical device manufacturing process. Another example is monitoring and validating temperatures at various stages of a pharmaceutical manufacturing process. The purpose of qualifying a process and the equipment used in such process is to document the performance of the process and equipment, either to satisfy regulatory requirements or to perform studies of production processes and equipment.

An example of a conventional validator is the Kaye Validator, sold by Amphenol Sensor Systems and illustrated in FIG. 17A as a validator 1700. As seen in FIG. 17A, the conventional validator 1700 comprises an enclosure 1710 and an interface 1720 comprising a display unit 1730 and a plurality of inputs 1740.

Referring now to FIG. 17B, there is illustrated a rear view of the validator 1700. As seen, the validator 1700 further comprises three internal receptacles, left, center, and right receptacles (not illustrated), for receiving sensor input modules (SIMs). Two of the receptacles of the validator 1700 (the left and right receptacles) are illustrated as not being used and are, therefore, covered by respective plates 1750A and 1750C. The center receptacle is illustrated as being used, and a sensor input module (SIM) 1755B is illustrated as being disposed therein. The SIM 1755B is connected to a plurality of temperature sensors for monitoring and validating temperatures of a process being qualified.

Disposed on the rear of the enclosure 1710 of the conventional validator 1700 is a plurality of ports 1760. FIG. 17C illustrates a close-up view of a portion 17C of the rear of the enclosure 1710 of the conventional validator 1700. As shown, the validator 1700 further comprises two ports 1760A and 1760B for a resistance temperature device (RTD), such as the Kaye Intelligent RTD sold by Amphenol Sensor Systems, and a port 1760C for temperature reference. The ports 1760A through 1760C may be RJ11 ports.

The validator 1700 further comprises a port 1760D for communicating with a computer, a port 1760E for communicating with a printer, a port 1760F for communicating with an external device, and a port 1760G for communicating with a programmable logic controller (PLC). The port 1760D may be a PC serial communication port; the port 1760E may be a parallel printer port; the port 1760F may be may be a USB port; and the port 1760G may be a NO/NC relay output port.

The conventional validator 1700 uses user-configured parameters to conduct the qualification procedure. Such parameters include start and stop qualification conditions, start and stop exposure conditions, etc. During a qualification study, the conventional validator 1700 collects and logs data provided by the sensors connected to the SIMs, such as the SIM 1755B. The conventional validator 1700 also performs calculations on collected data. Calculations may include: lethality calculations, saturated steam calculations, statistical calculations, interval summary calculations, interval minimum calculations, interval maximum calculations, and interval average calculations.

The collected and calculated data, referred to as "qualification data," may be displayed in real-time on the display unit 1730. They may also be stored in an internal memory in the conventional validator 1700 or exported to a USB storage device connected to the port 1760F. The conventional validator 1700 may generate reports based on the qualification data. It may also export the qualification data to a printer attached to the port 1760E for printing in a report.

During the qualification study, the conventional validator 1700 also displays and logs qualification events, such as the qualification study time (an elapsed time since the beginning of the study), an exposure cycle time, a qualification start event, exposure cycle start and stop events, each occurrence of all group (collection of sensors) events that have been triggered during the study, and a stop qualification event. A time stamp (date and time) for each event is displayed and logged.

After the qualification study is complete, the validator 1700 may generate a qualification report.

SUMMARY OF THE INVENTION

In accordance with an aspect of the present invention, there is provided a system for qualifying a process in a facility. The system includes a validation system and a portable computer device. The validation system includes a storage device, a processing device, and one or more sensor input modules each connected to one or more sensors. The portable computer device includes a storage device and a processing device. The storage device of the portable computer device includes a database comprising a record for an asset, the record comprising a configuration file for configuring the validation system to perform a qualification of the asset. The processing device of the portable computer device is configured to transmit the configuration file to the validation system for storage in the storage device of the validation system. The processing device of the validation system is configured to load the configuration file stored in the storage device of the validation system and to perform the qualification of the asset based on the loaded configuration file.

In accordance with another aspect of the present invention, there is provided a method for qualifying a process in a facility. The method includes steps of storing a configuration file in a record in a database stored on a tangible computer readable storage medium of a portable computer device; transmitting the configuration file to the validation system for storage in a tangible computer readable storage medium of the validation system; loading and executing the configuration file stored in the tangible computer readable storage medium of the validation system to cause a processing device of the validation system to perform a qualification of an asset based on the loaded configuration file; and receiving and storing data from a plurality of sensors communicating with the validation system during the qualification.

BRIEF DESCRIPTION OF THE DRAWINGS

For the purpose of illustration, there are shown in the drawings certain embodiments of the present invention. In the drawings, like numerals indicate like elements throughout. It should be understood that the invention is not limited to the precise arrangements, dimensions, and instruments shown. In the drawings:

FIG. 4B illustrates a new asset screen rendered in the touch-sensitive display of the tablet computer of FIG. 1A, in accordance with an exemplary embodiment of the present invention;

FIG. 5 illustrates a method for adding an asset to the validation and monitoring system of FIG. 1A, in accordance with an exemplary embodiment of the present invention;

FIG. 6B illustrates a define asset screen rendered in the touch-sensitive display of the tablet computer of FIG. 1A, in accordance with an exemplary embodiment of the present invention;

FIG. 7 illustrates a method for generating a configuration file for an asset of the validation and monitoring system of FIG. 1A, in accordance with an exemplary embodiment of the present invention;

FIG. 9 illustrates a method for adding a piece of equipment to the validation and monitoring system of FIG. 1A, in accordance with an exemplary embodiment of the present invention;

DETAILED DESCRIPTION OF THE PREFERRED EMBODIMENTS

Figure 1A:
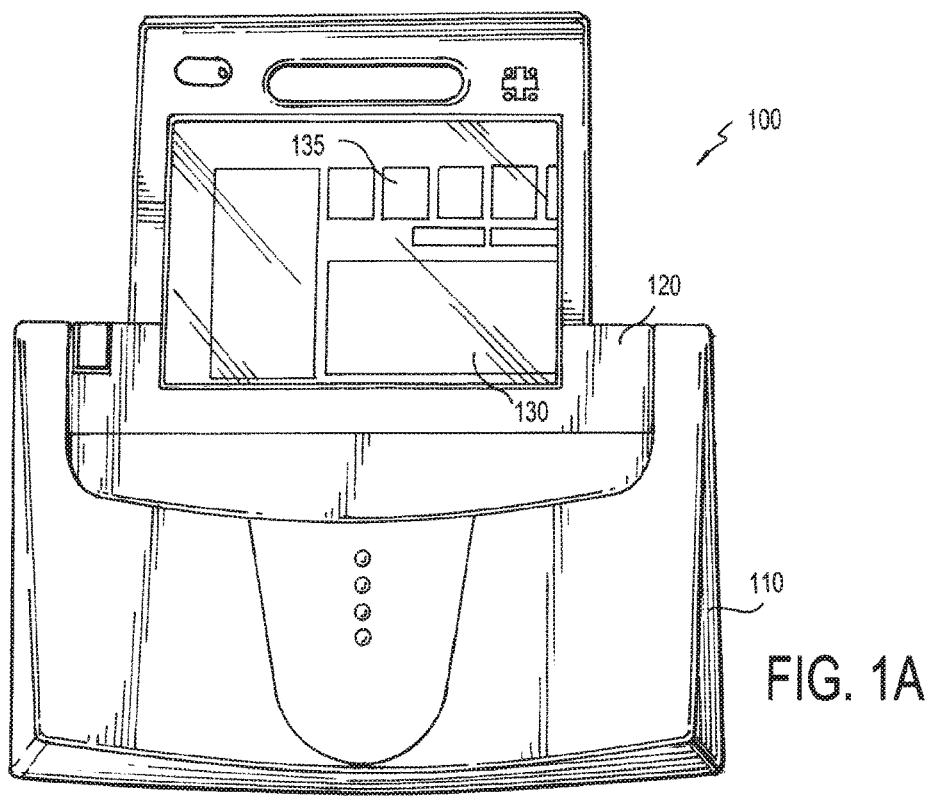
FIG. 1A illustrates a front view of a validation and monitoring system comprising a tablet computer, a docking station, and an automated validation system (AVS), the tablet computer having a touch-sensitive display, in accordance with an exemplary embodiment of the present invention.
Figure 17C:
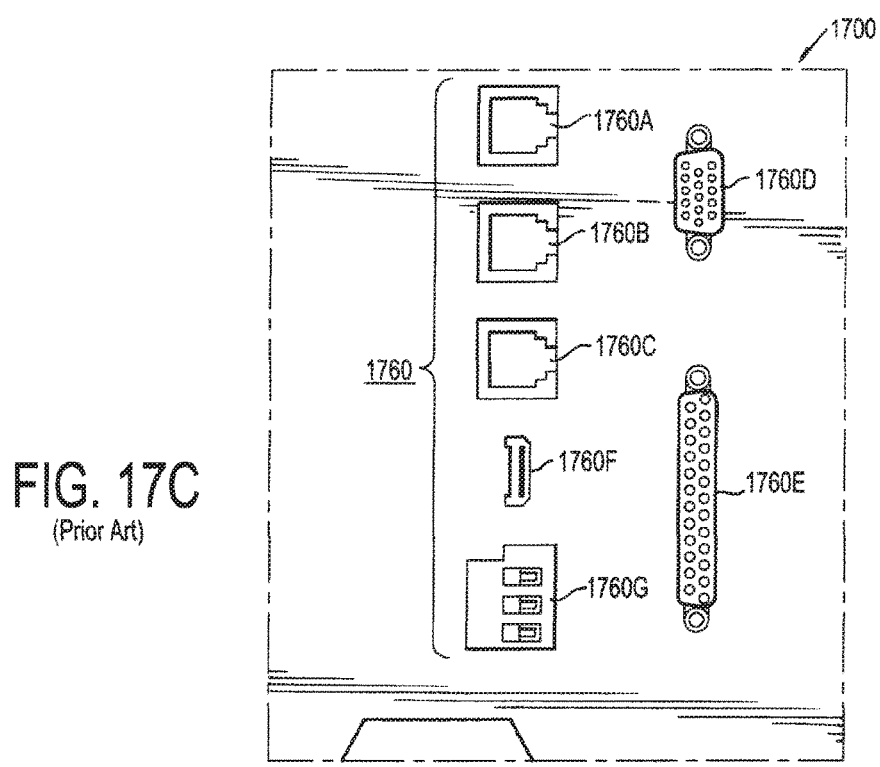
FIGS. 17A, 17B, and 17C illustrate a conventional validator.

In describing the preferred embodiments of the present invention illustrated in the drawings, specific terminology is resorted to for the sake of clarity. However, the present invention is not intended to be limited to the specific terms so selected, and it is to be understood that each specific term includes all technical equivalents that operate in a similar manner to accomplish a similar purpose.

The validation report generated by the conventional validator 1700 has several limitations. First, the conventional validator 1700 does not provide the ability to search all studies conducted using the conventional validator 1700 and other equipment. Second, reports are provided on a qualification-study basis, not on an asset basis. Thus, there is no ability to view all studies, setups, and reports for a specific asset that has been validated. Third, the conventional validator 1700 provides no ability to identify equipment that are due or past due for calibration and no ability to identify the prior qualification studies that are under risk because of reliance upon assets that were due or past due for calibration. Accordingly, it would be desirable for a validator to provide for the ability to search all studies conducted using the validator and other equipment, to view all studies, setups, and reports for a specific asset that has been validated, to identify equipment that is due or past due for calibration, and to identify prior qualification studies that are under risk because of reliance upon assets that were due or past due for calibration.

Illustrated in FIG. 1A is an intelligent validation and monitoring system 100, in accordance with an exemplary embodiment of the present invention. The system 100 comprises an Automated Validation System (AVS) 110, a docking station 120, and a portable computer device, such as a tablet computer (hereinafter "tablet") 130, having a touch-sensitive display 135. The tablet 130 can be electronically and mechanically removably coupled with the docking station 120, and the docking station 120 can be electronically and mechanically removably coupled with the AVS 110, as set forth in co-pending India patent application no. 728/DEL/2015, entitled "Docking System" and filed Mar. 17, 2015, the entire contents of which are hereby incorporated by reference.

Figure 1B:
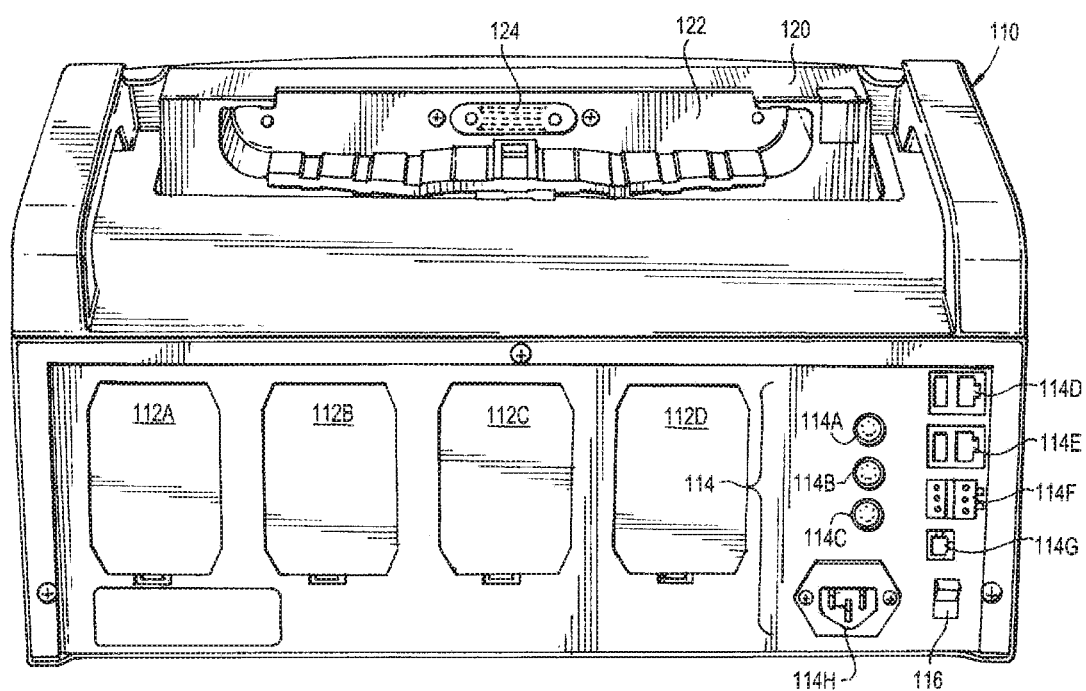
FIG. 1B illustrates a rear view of the validation and monitoring system of FIG. 1A, in accordance with an exemplary embodiment of the present invention.

Referring now to FIG. 1B, there is illustrated a rear view of the intelligent validation and monitoring system 100, in accordance with an exemplary embodiment of the present invention. As shown, the docking station 120 comprises a dock 122 for mechanically securing the tablet 130 within the docking station 120. The dock 122 includes a connector 124 for mating with a port of the tablet 130 to provide for electronic communication between the tablet 130 and the docking station 120 and, therefore, between the tablet 130 and the AVS 110. In an exemplary embodiment, the connector 124 is a USB plug that connects with a USB port on the tablet 130.

Figure 1C:
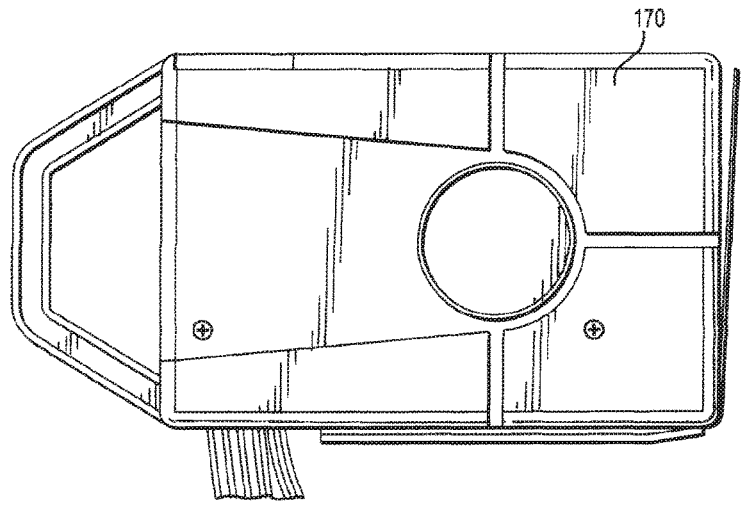
FIG. 1C illustrates a sensor input module used with the validation and monitoring system of FIG. 1A, in accordance with an exemplary embodiment of the present invention.

The AVS 110 further comprises four internal receptacles, left, center left, center right, and right receptacles (not illustrated), for receiving sensor input modules (SIMs). All of the receptacles of the intelligent validation and monitoring system 100 are illustrated as not being used and are, therefore, covered by respective plates 112A through 112D. An example of a SIM is illustrated in FIG. 1C and is generally designated as 170.

Disposed on the rear of the AVS 110 is a plurality of ports 114. Included among the ports 114 are three ports 114A through 114C for one or more resistance temperature devices (RTDs), such as the Kaye Intelligent RTD (IRTD) sold by Amphenol Sensor Systems, and/or for one or more temperature references, such as a bath, such as the Kaye HTR and LTR series uniform dry well and the Kaye CTR series uniform liquid bath. Also included among the ports 114 are USB and Ethernet ports 114D and 114E, a port 114F for communicating with a programmable logic controller (PLC), a port 114G for communicating with a calibration device, and a port 114H for receiving a power plug. In an exemplary embodiment, the ports 114A through 114C are 4-pin Din connectors that may conform with the RS-232 protocol; the ports 114D and 114E each include one USB port and one Ethernet port for communicating with a processing device, such as the tablet 110, or if not docked in the docking station 120, a USB storage device, etc.; the port 114F comprises two NO/NC relay output ports for communicating with one or two PLCs; and the port 114G is a USB port for communicating with an intelligent calibration device. Also disposed on the rear of the AVS 110 is an on/off switch 116.

Figure 2:
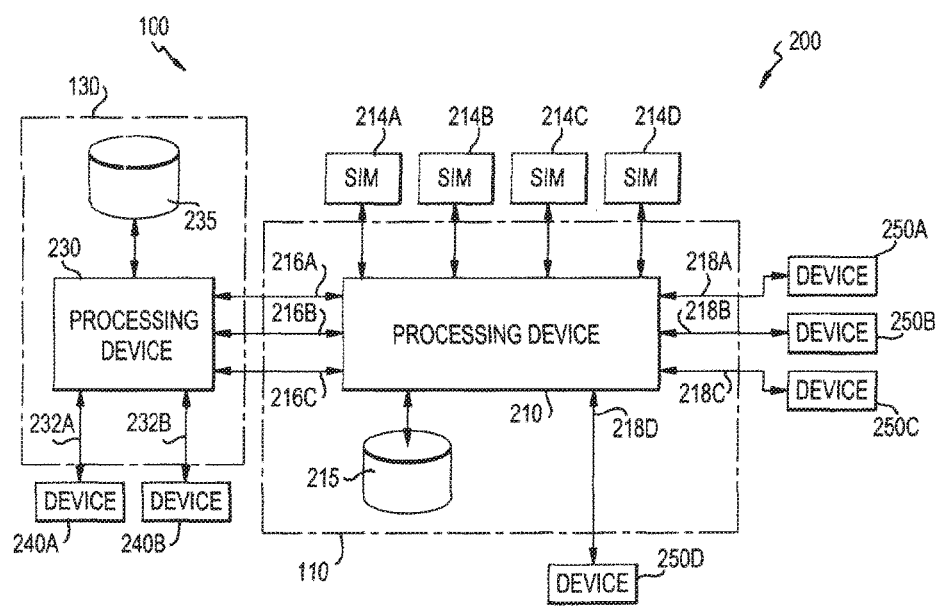
FIG. 2 illustrates a diagram of functional components of the validation and monitoring system of FIG. 1A, in accordance with an exemplary embodiment of the present invention.

Illustrated in FIG. 2 is a diagram 200 of functional components of the system 100, in accordance with an exemplary embodiment of the present invention. As shown, the AVS 110 includes a processing device 210 and a plurality of communications means 212A through 212D providing for communications between the processing device 210 and respective SIM cards 214A through 214D, which each may be constructed similarly to the SIM card 170. In an exemplary embodiment, the communications means 212A through 212D are USB connections made via USB ports internal to the AVS 110 and USB connectors on the SIM cards 214A through 214D.

The AVS 110 further includes a plurality of communications means 216A through 216C providing for communications between the processing device 210 and the tablet 130. In an exemplary embodiment, the communications means 216A through 216C are, respectively, a Wi-Fi connection, a USB connection, and an Ethernet connection. The Wi-Fi connection 216A may be made via a Wi-Fi modem internal to the AVS 110 and a Wi-Fi modem internal to the tablet 130. In an exemplary embodiment, the USB connection 216B may be made via the USB plug 124 in the dock 122 and the USB port on the tablet 130. The Ethernet connection 216C may be made via the Ethernet port in either of the USB/Ethernet ports 114D and 114E, Ethernet cabling, and an Ethernet port on the tablet 130.

In an exemplary embodiment, the AVS 110 may be connected to a network via the Ethernet port in either of the USB/Ethernet ports 114D and 114E or via the Wi-Fi modem internal to the AVS 110. In such exemplary embodiment, the tablet 130 may be connected to the network via its Ethernet port or its internal Wi-Fi modem. The tablet 130 may communicate and connect with any AVS, including the AVS 110, on such network.

The AVS 110 further includes a plurality of further communications means 218A through 218D providing for communications between the processing device 210 and a plurality of respective external devices 250A through 250D. In an exemplary embodiment, such as the exemplary embodiment of the AVS 110 illustrated in FIG. 1B, the communications means 218A through 218C are each an RS-232 connection, which may be made via the ports 114A through 114C, RS-232 cabling, and ports on the respective devices 250A through 250C. In an exemplary embodiment, such as the exemplary embodiment of the AVS 110 illustrated in FIG. 1B, the communications means 218D is a USB connection, which may be made via the USB port 114D or 114E, USB cabling (depending on the device 250D), and a port or connector on the device 250D, which may be a USB thumb drive or USB storage device.

The external devices 250A through 250C are equipment and may be any of one temperature reference and one or more resistant temperature device (RTD) probes. The temperature reference may be a calibration bath, such as a Kaye HTR Series Uniform Dry Well (described in "Kaye HTR 400 User's Manual," M4395 Rev. D, May 2014, published by Amphenol Advanced Sensors); a Kaye LTR Series Uniform Dry Well (described in "Kaye LTR-25/140 and LTR-40/140 User's Manual," M4374 Rev. E, May 2014, published by Amphenol Advanced Sensors); or a Kaye CTR Series Uniform Liquid Baths (described in "Kaye CTR-80 User's Manual," M4336 Rev. E, May 2014, published by Amphenol Advanced Sensors). The one or more RTD probes may be Intelligent RTD (IRTD) probes sold by Amphenol Advanced Sensors and described in "IRTD User's Manual," M2845-6 Rev. C, March 2014, published by Amphenol Advanced Sensors. All of these foregoing manuals are incorporated herein by reference in their entirety.

The AVS 110 further includes a tangible computer-readable storage medium or storage device 215 in communication with the processing device 210. The tangible computer-readable storage medium 215 may be any available computer storage medium that can be accessed by the processing device 210. Such computer-readable storage medium includes both volatile and nonvolatile and removable and non-removable media implemented in any method or technology for storage of information such as computer-readable software instructions, data structures, program modules, data collected via the SIM cards 214A through 214D, data collected via any of the devices 250A through 250C, one or more configuration (setup) files received from the device 250D and/or the tablet 130, one or more qualification data files, or other data.

The computer-readable storage medium 215 has software code stored thereon that, when executed by the processor processing device 210 of the AVS 110 causes the AVS 110 to perform any of the functionality of the AVS 110 described herein. Thus, any of the functionality performed by the AVS 110 described herein, such as certain steps of the various functions and methods described below, is implemented in software code or instructions which are tangibly stored on the computer-readable storage medium 215. Upon loading and executing such software code or instructions by the processing device 210, the AVS 110 may perform any of the functionality of the AVS 110 described herein, including any steps of the methods described below as being performed by the AVS 110, including receiving data from and/or transmitting data to the tablet 130 (via the communications means 216A through 216C), the devices 250A through 250D (via the communications means 218A through 218D), and/or the SIM cards 214A through 214D (via the communications means 212A through 212C), and/or storing data in or retrieving data from the tangible computer-readable storage medium 215.

The tablet 130 comprises a processing device 230 having a plurality of communications means 232A and 232B for communicating, respectively, with external devices 240A and 240B. In an exemplary embodiment, the device 240A may be a storage device 240A, and the device 240B may be a printer. The communications means 232A and 232B may include any combination of Wi-Fi modems, USB ports, and Ethernet ports, associated cabling, and associated Wi-Fi modems, USB ports, and Ethernet ports on the devices 240A and 240B. In an exemplary embodiment, either of the devices 240A or 240B may be a network server connected to a plurality of systems 100 for collecting data gathered by the plurality of systems 100 and storing such data in a database. In an exemplary embodiment, the device 240A may be a USB storage device, and the device 240B may be a printer.

The tablet 130 further includes a tangible computer-readable storage medium or storage device 235 in communication with the processing device 230. The tangible computer-readable storage medium 235 may be any available computer storage medium that can be accessed by the processing device 230. Such computer storage medium includes both volatile and nonvolatile and removable and non-removable media implemented in any method or technology for storage of information such as computer-readable software instructions, data structures, program modules, data collected via the SIM cards 214A through 214D, data collected via any of the devices 250A through 250D, one or more configuration (setup) files, one or more qualification data files received from the AVS 110, one or more equipment records, one or more asset records, report templates, or other data.

The computer-readable storage medium 235 has software code stored thereon that, when executed by the processor processing device 230 of the tablet 130 causes the tablet 130 to perform any of the functionality of the tablet 130 described herein. Thus, any of the functionality performed by the tablet 130 described herein, such as the methods described below, is implemented in software code or instructions which are tangibly stored on the computer-readable storage medium 235. Upon loading and executing such software code or instructions by the processing device 230, the tablet 130 may perform any of the functionality of the tablet 130 described herein, including any steps of the methods described below as being performed by the tablet 130, including transmitting data to and/or receiving data from the AVS 110 (via the communications means 216A through 216C) and/or the devices 240A and 240B, and/or storing data in or retrieving data from the tangible computer-readable storage medium 235.

The computer-readable storage media 215 and 235 may include any memory devices, such as magnetic media, optical media, magneto-optical media, and solid-state media. Magnetic media include magnetic cassettes, magnetic tape, magnetic disk storage (computer hard drive), or other magnetic storage devices. Optical media include optical discs, such as compact disc read-only memory (CDROM), digital versatile disks (DVD), or other optical disk storage. Magneto-optical media include magneto-optical drives. Solid-state memory includes random access memory (RAM), read-only memory (ROM), Electrically-Erasable Programmable Read-Only Memory (EEPROM), flash memory, or other memory technology.

Additionally, each of the processing devices 210 and 230 device may be, for instance, a computer processor or a device comprising a computer processor, such as a personal computer (PC), server, or mainframe computer, or more generally a computing device, processor, application specific integrated circuit (ASIC), or controller. The processing devices 210 may 230 may each be provided with one or more of a wide variety of components or subsystems including, for example, a co-processor, registers, data processing devices and subsystems, wired or wireless communication links, input devices (such as a touch screen, keyboard, mouse, etc.) for user control or input, monitors for displaying information to the user, and/or storage device(s) such as memory, RAM, ROM, DVD, CD-ROM, analog or digital memory, flash drive, database, computer-readable media, floppy drives/disks, and/or hard drive/disks. It should further be noted that while the AVS 110 and the tablet 130 each have their own respective processing device 210, 230 and storage medium or device 215, 235, the AVS 110 and tablet 130 can share a single processing device 210, 230 and/or storage 215, 235 in exemplary alternative embodiments.

The system 100 is used for qualifying important processes and/or applications, such as pharmaceutical, biotechnology, and medical device manufacturing processes. Exemplary processes include a sterilization procedure in a medical device manufacturing process, temperatures at various stages of a pharmaceutical manufacturing process, etc. A qualification study (i.e., a qualification) may be performed to satisfy regulatory requirements or to perform studies of production processes for quality control and compliance.

The AVS 110 uses user-configured parameters (stored in a configuration (setup) file in the computer-readable storage medium 215) to conduct a qualification study for an asset used in a process in a facility. The AVS 110 is usually stationary and is wired to sensors associated with the asset used in the process to be qualified. The sensors are wired to the SIMs 214A through 214D connected to the AVS 110 via the receptacles behind the plates 112A through 112D. The parameters specified in the configuration (setup) file include start and stop qualification conditions, start and stop exposure conditions, etc. During a qualification study, the AVS 110 collects and logs data provided by the sensors connected to the SIMs 214A through 214D. The sensors monitor conditions in the asset, e.g., a sterilizer, dry heat oven, freezer, etc., used in the process being validated. The one or more sensors connected to the AVS 110 are all associated with or coupled to a single asset. Accordingly, each AVS is associated with a single asset via the SIMs 214A through 214D. The sensors connected to an AVS are used to detect conditions of their associated asset and to transmit the detected conditions as sensor data to the AVS.

During qualification (FIGS. 10A and 11), the AVS 110 collects qualification data (e.g., sensor data (readings or measurements)) and stores it in its storage medium or device 215. The AVS 110 performs a qualification study according to the setup (configuration). A qualification study can run from 3 to 70 hours or more, for example. The AVS 110 performs calculations on the sensor data collected during the qualification study. Calculations may include: lethality calculations, saturated steam calculations, statistical calculations, interval summary calculations, interval minimum calculations, interval maximum calculations, and interval average calculations. The collected and calculated data, referred to as "qualification data," may also be stored in internal memory in the AVS 110, such as in the storage medium 215, exported to a USB storage device, such as the device 250D, or transmitted to the tablet 130 and stored in the storage medium 235 of the tablet 130, such as in a database (hereinafter also referred to as "database 235") stored in the storage medium 235. The qualification data may be displayed in real-time on the display 135 of the tablet 130. The tablet 130 may generate reports based on the qualification data, as described in greater detail below.

The AVS 110 interfaces via the communications means 250A through 250C with a plurality of pieces of equipment. The AVS 110 uses user-configured parameters (stored in the configuration (setup) file) to calibrate the sensors connected to the SIMs 214A through 214D and to verify the calibration of sensors used with an asset. Equipment is used to calibrate the sensors connected to the SIMs 214A through 214D connected to the AVS 110 prior to a qualification study to aid in data collection. For example, equipment, such as an IRTD and a bath, is used to calibrate the sensors connected to the SIMs 214A through 214D connected to the AVS 110 prior to data collection by the AVS 110. This is done to prove that the sensors are within their range of accuracy during the qualification study and to determine sensor offsets. During calibration before a qualification, the AVS 110 calibrates the sensors (connected to any of the SIMs 214A through 214D) according to the setup (configuration) using equipment 250A, 250B, and/or 250C and stores sensor calibration information in its storage medium or device 215 with identification information of the equipment used for performing the calibration.

Equipment is also used to verify calibration of the sensors connected to the SIMs 214A through 214D connected to the AVS 110 after the qualification study to help ensure that the sensors remained within acceptable calibration ranges during the qualification study. As further described below, each piece of equipment is desirably calibrated and, therefore, has its own calibration due date. For the system 100 to work in an optimal condition, all equipment that is used with the AVS 110 should have a valid calibration, i.e., not be due or past due for calibration. During calibration verification after a qualification, the AVS 110 verifies the calibration of the sensors (connected to any of the SIMs 214A through 214D) according to the setup (configuration) using equipment 250A, 250B, and/or 250C and stores sensor calibration verification information in the storage medium or device 215 with identification information of the equipment used for verifying the calibration.

In general operation, the tablet 130 is a portable electronic device that one or more users can operate. The tablet 130 renders an interface in the display 135 by which a user may program a setup (configuration) that controls how the AVS 110 calibrates its sensors, verifies calibration of its sensors, and collects data from its sensors (FIGS. 6B and 6C) during a qualification of the asset. The user transmits the setup (configuration) to the AVS 110 as a configuration (setup) file for storage in the computer-readable storage medium 215 by docking the tablet 130 in the dock 120 of the AVS 110 or by connecting the tablet 130 to the AVS 110 over Wi-FI or Ethernet.

The tablet 130 can be docked with any AVS for programming it to run calibrations, verifications of calibrations, and qualifications using the same setup (configuration) that it used for the AVS 110 or a different setup. The tablet 130 can be in communication via Wi-Fi or Ethernet with an AVS for programming it to run calibrations, verifications of calibrations, and qualifications using the same setup (configuration) that it used for the AVS 110 or a different setup. The tablet 130 can be undocked or disconnected from the AVS 110 after programming the AVS 110 to run the calibrations, verifications of calibrations, and qualifications. The tablet 130 can further be docked with any AVS to receive calibration, verification, and qualification data for report generation and qualification studies/audits. Furthermore, the tablet 130 can be docked with any AVS to monitor an ongoing study for errors or proper parameters being met. When docked to the AVS 110 or in communication with it via Wi-Fi or Ethernet, the tablet 130 can receive the calibration, verification, and qualification data stored in the storage medium or device 215, store such information in the database 235, and generate reports on the calibration, verification, and qualification data for a selected asset. Thus, the system provides a direct link between assets and report generation.

Figure 3:
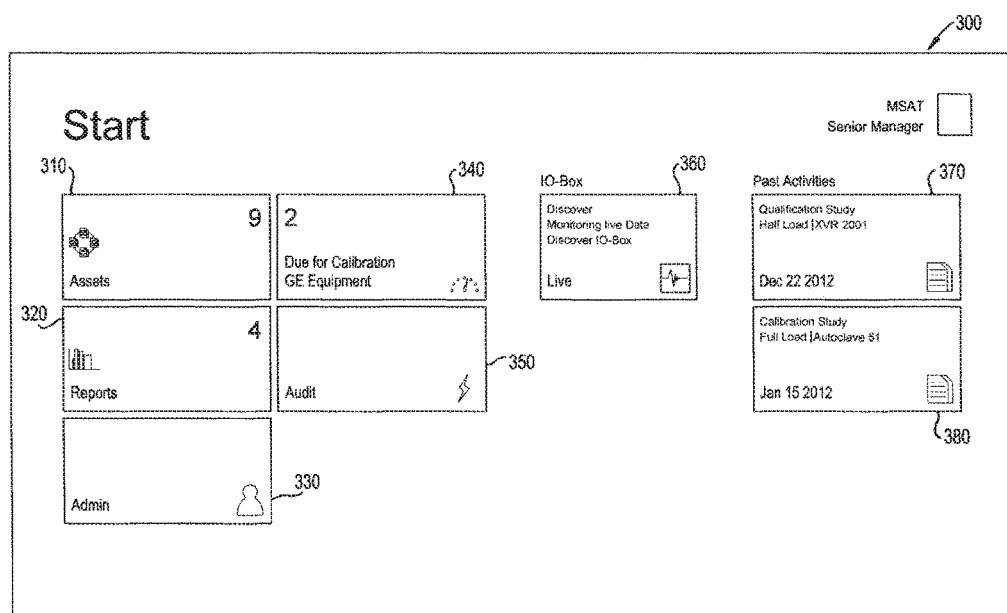
FIG. 3 illustrates a main screen rendered in the touch-sensitive display of the tablet computer of FIG. 1A, in accordance with an exemplary embodiment of the present invention.

Referring now to FIG. 3, there is illustrated a main screen 300 rendered by the tablet 130 in the touch-sensitive display 135, in accordance with an exemplary embodiment of the present invention. The main screen 300 comprises a plurality of user-selectable display areas or tiles 310 through 380. The tile 310 links to an asset hub 400A (FIG. 4A); the tile 320 links to a reports hub; the tile 330 links to an administrator hub; the tile 340 links to an equipment hub 800A (FIG. 8A); and the tile 350 links to an audit hub. The tile 360 links to a live data hub for monitoring live data collected by the system 100. The tile 370 links to a qualification study that was previously performed. The tile 380 links to a calibration study that was previously performed.

Selection of one of the tiles 310 through 380 launches a respective operation. During routine use of the system 100, a user selects the tile 310 to access the asset hub 400A (described in further detail below with respect to FIG. 4A) to select an asset to (1) program a configuration (setup) for calibrating sensors associated with the asset, for performing a qualification of the asset, and for verifying calibration of the sensors associated with the asset, (2) perform a calibration of the sensors associated with the asset, (3) perform a qualification study of the asset, (4) verify a calibration of the sensors associated with the asset, and (5) run reports on calibrations and/or qualifications.

To calibrate the sensors associated with an asset, the user selects the tile 310 on the main screen 300 to access the asset hub 400A. From the asset hub 400A (FIG. 4A), the user then selects an asset displayed therein. The tablet 130 searches the database 235 for configuration (setup) files available for the selected asset and displays the available configurations (setups). The user selects the desired configuration (setup) for calibration and then the AVS (e.g., the AVS 110) to be programmed with the selected configuration (setup) to calibrate the sensors associated with the selected asset. The tablet 130 transmits the selected configuration (setup) to the selected AVS to program it to perform a calibration specified by the selected configuration (setup). The AVS 110 collects data from the sensors and the equipment used in calibrating the sensors during the calibration in accordance with the selected configuration (setup) and stores the sensor calibration data in the database 215 for later transmission to the tablet 130 for later reporting.

To have a qualification performed, the user selects the tile 310 on the main screen 300 to access the asset hub 400A. From the asset hub 400A, the user then selects an asset displayed therein. The tablet 130 searches the database 235 for configuration (setup) files available for the selected asset and displays the available configurations (setups). The user selects the desired configuration (setup) for qualification and then the AVS (e.g., the AVS 110) to be programmed with the selected configuration (setup) to run the qualification study of the selected asset. The tablet 130 transmits the selected configuration (setup) to the selected AVS to program it to perform a qualification study specified by the selected configuration (setup). The AVS 110 collects data from the sensors and the asset during the qualification study in accordance with the selected configuration (setup) and stores the qualification data in the database 215 for later transmission to the tablet 130 for later reporting.

To verify calibration of the sensors associated with an asset after a qualification study has been performed, the user selects the tile 310 on the main screen 300 to access the asset hub 400A. From the asset hub 400A, the user then selects an asset displayed therein. The tablet 130 searches the database 235 for configuration (setup) files available for the selected asset and displays the available configurations (setups). The user selects the desired configuration (setup) for calibration verification and then the AVS (e.g., the AVS 110) to be programmed with the selected configuration (setup) to verify calibration of the sensors associated with the selected asset. The tablet 130 transmits the selected configuration (setup) to the selected AVS to program it to perform a verification of calibration specified by the selected configuration (setup). The AVS 110 collects data from the sensors and the equipment used in verifying the calibration of the sensors during the verification in accordance with the selected configuration (setup) and stores the calibration verification data in the database 215 for later transmission to the tablet 130 for later reporting.

To generate asset-based reports, the user selects the tile 310 on the main screen 300 to access the asset hub 400A. From the asset hub 400A, the user then selects an asset displayed therein. The tablet 130 searches the database 235 for report templates available for the selected asset and displays the available report templates. The user selects a report template for generating a desired report regarding the selected asset. Further description of asset-based reporting is provided below.

Figure 8A:
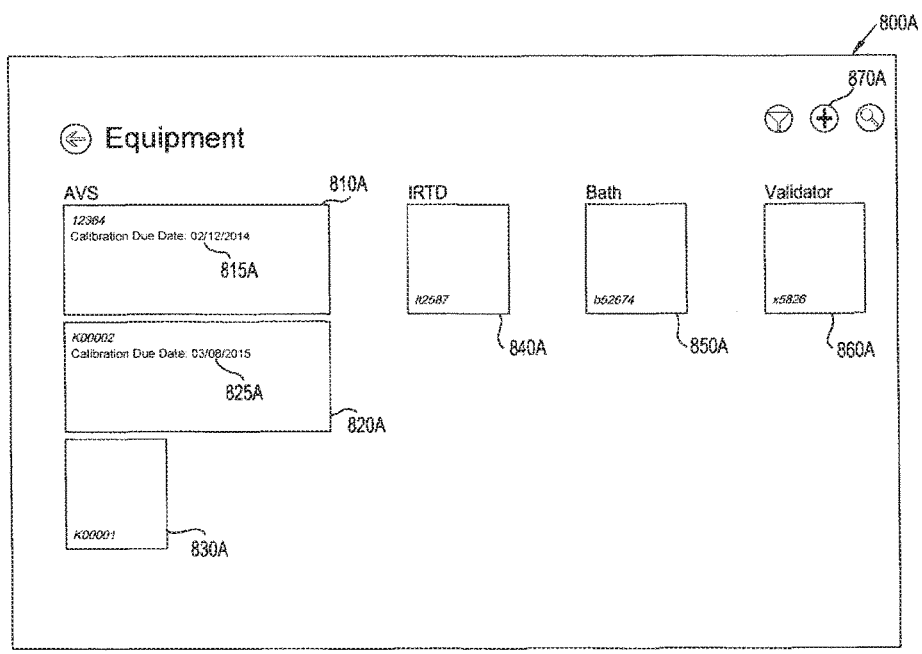
FIG. 8A illustrates an equipment hub screen rendered in the touch-sensitive display of the tablet computer of FIG. 1A, in accordance with an exemplary embodiment of the present invention.

To generate equipment-based reports, the user selects the tile 340 on the main screen 300 to access the equipment hub 800A (FIG. 8A). From the equipment hub 800A, the user then selects a piece of equipment displayed therein. The tablet 130 searches the database 235 for report templates available for the selected piece of equipment and displays the available report templates. The user selects a report template for generating a desired report regarding the piece of equipment. Further description of equipment-based reporting is provided below.

Figure 4A:
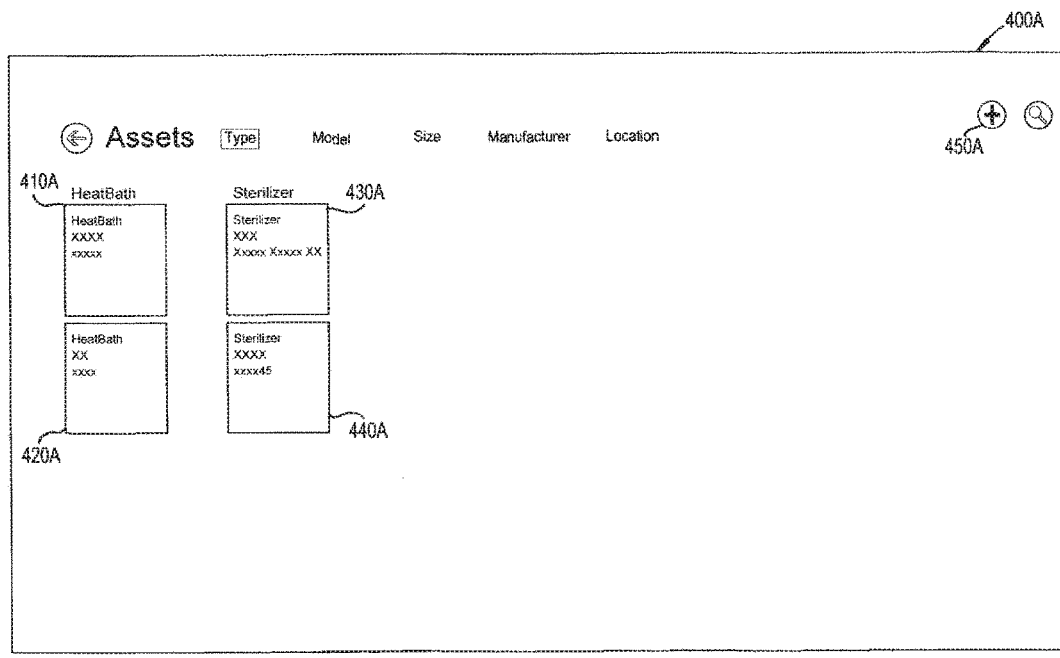
FIG. 4A illustrates an asset hub screen rendered in the touch-sensitive display of the tablet computer of FIG. 1A, in accordance with an exemplary embodiment of the present invention.

An exemplary embodiment of an asset hub 400A is illustrated in FIG. 4A. The asset hub 400A is rendered by the tablet 130 in the touch-sensitive display 135. The asset hub 400A comprises four user-selectable display areas or tiles 410A, 420A, 430A, and 440A, each corresponding to a unique asset and, more specifically, to a record of such asset in the database 235. The tablet 130 retrieves the records of assets from the database 235 and displays the asset name and asset ID from each retrieved record in a tile in the asset hub 400A. In the embodiment shown, the tile 410A corresponds to a first heat bath, and the tile 420A corresponds to a second heat bath. The tile 430A corresponds to a first sterilizer, and the tile 440A corresponds to a second sterilizer. Selection of one of the tiles 410A through 440A by a user causes the tablet 130 to navigate to an asset detail screen for the asset corresponding to the selected tile 410A through 440A. The asset hub 400A further comprises a link 450A for adding an asset to the system 100.

Figure 4B:
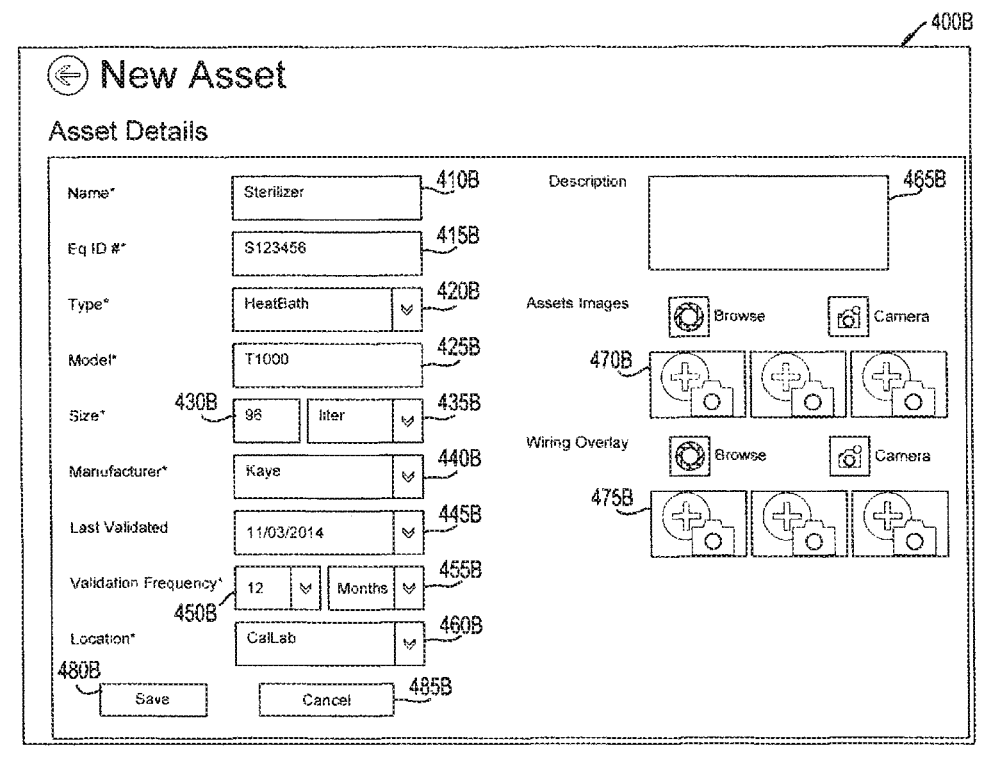

Selection of the link 450A causes the tablet 130 to navigate to a new asset detail screen 400B, an exemplary embodiment of which is illustrated in FIG. 4B. The new asset detail screen 400B is rendered by the tablet 130 in the touch-sensitive display 135. The new asset detail screen 400B comprises various fields and drop-down boxes 410B through 475B rendered in the new asset screen 400B. The user enters information regarding the new asset via the various fields and drop-down boxes 410B through 475B, and the tablet 130 stores the entered information in a record in the database 235 for the new asset.

Referring now to FIG. 5, there is illustrated a method, generally designated as 500, for adding an asset to the system 100, in accordance with an exemplary embodiment of the present invention. Selection of the link 450A in the asset hub 400A by a user causes the tablet 130 to execute the method 500 of adding a new asset to the system 100 so that the process in which the new asset will be used may be qualified at a later time. For example, if the user is setting up a new pharmaceutical manufacturing process, the user would add a new asset to the system 100 so that the pharmaceutical manufacturing process can be qualified (validated). As another example, if a pharmaceutical manufacturing process is undergoing maintenance and assets used therein are being replaced, the user would add a new asset to the system 100 to that the revamped pharmaceutical manufacturing process can be qualified (validated). In yet another example, when the user installs the system 100 for the first time for qualifying (validating) a process, the user would add to the system 100 all of the assets of the process to be qualified (validated).

Description of the method 500 is made with reference to FIGS. 4A and 4B. The tablet 130 performs the method 500 and may do so when not in communication with the AVS 110, i.e., not docked with the AVS 110 and not in communication with the AVS 110 over Wi-Fi or Ethernet, or when in communication with the AVS 110, i.e., docked with the AVS 110 or in communication with the AVS 110 over Wi-Fi or Ethernet.

Beginning in a Step 510, after selection of the link 450A in the asset hub 400A, the tablet 130, specifically the processing device 230 thereof, adds a record in the database 235 for the new asset. The method 500 continues to a Step 520 in which the tablet 130 creates a unique asset ID for the new asset, stores it in the database 235 in the record for the new asset, and navigates to the new asset screen 400B. The user enters asset information (asset identification information and asset detail information) via the various fields and drop-down boxes 410B through 475B rendered in the new asset screen 400B, which the tablet 130 receives in a Step 530. In an exemplary embodiment, the user enters asset identification information, such as a name of the asset via a text field 410B and an alphanumeric ID via a text field 415B, and asset detail information, such as an identification of the type of the asset (autoclave, sterilizer, heat bath, etc.) via a drop-down box 420B, an alphanumeric model designation via a text field 425B, a numerical size of the asset via a text field 430B, an identification (via a drop-down box 435B) of the units for the information entered in the text field 430B, a selection of the manufacturer of the asset via a drop-down box 440B, a selection of a date on which the asset was last validated via a calendar selection field 445B, a numerical validation frequency of the asset via a text field 450B, an identification (via a drop-down box 455B) of the units for the information entered in the text field 450B, and a selection of a location of the asset via a drop-down box 460B. The user may enter a further description regarding the new asset in a text field 465B, add images of the asset via fields 470B, and add images of a wiring overlay of the asset showing where sensors will be located via fields 475B. In an exemplary embodiment, the fields and drop-down boxes 410B, 415B, 420B, 425B, 430B, 435B, 440B, 450B, 455B, and 460B are mandatory, and the user is required to enter or select values for these fields and drop-down boxes before exiting the screen 400B.

The tablet 130 receives all of the selected and entered information in the Step 530. After the user selects a "Save" button 480B, the processing device 230 of the tablet 110 stores the received asset information in the record of the new asset in the database 235, Step 540. The user may cancel the addition of the new asset at any time by selecting a "Cancel" button 485B. The method 500 terminates in a Step 550.

Figure 6A:
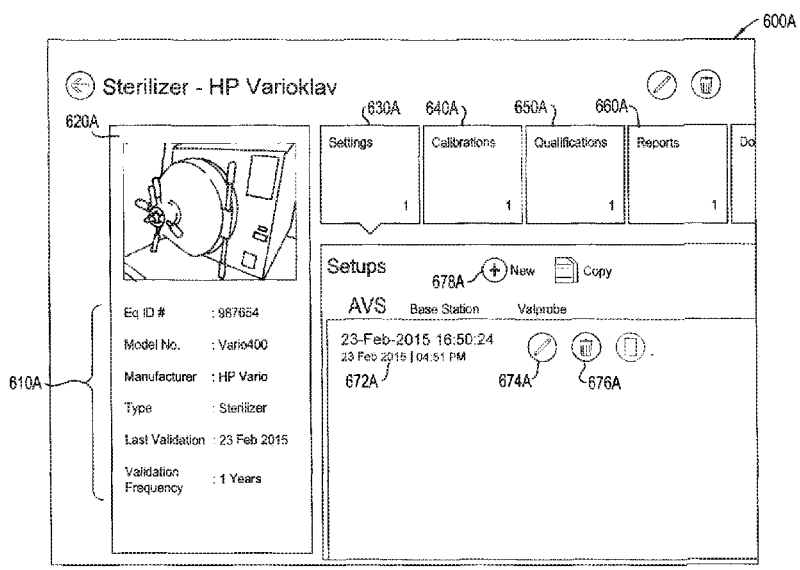
FIG. 6A illustrates an asset detail screen rendered in the touch-sensitive display of the tablet computer of FIG. 1A and, specifically, a setup hub displayed therein, in accordance with an exemplary embodiment of the present invention.

Referring now to FIG. 6A, there is illustrated an asset detail screen, generally designated as 600A, for an asset, in accordance with an exemplary embodiment of the present invention. The asset detail screen 600A is rendered by the tablet 130, specifically by the processing device 230 thereof, in the touch-sensitive display 135 for a specific asset based on data stored in a record in the database 235 for such asset and retrieved from the database 235 based on the user-selection of a tile in the asset hub 400A associated with the assert. The tablet 130 locates the record for the asset within the database 235 by searching the database 235 for a record containing asset identification information, e.g., asset name or asset ID, that matches the asset identification information, e.g., asset name or asset ID, displayed in the tile selected in the asset hub 400A. The exemplary asset detail screen 600A illustrated in FIG. 6A is for a sterilizer.

The asset detail screen 600A comprises text information 610A regarding the asset and a picture 620A of the asset. In the particular example illustrated, the text information includes the following: "Eq ID #: 987654," "Model No: Vario400," "Manufacturer: HP Vario," "Type: Sterilizer," "Last Validation: 23 Feb. 2015," and "Validation Frequency: 1 Years." This information is contained in the record for the selected asset retrieved from the database 235 by the tablet 130.

Disposed at the top of the asset detail screen 600A is a plurality of user-selectable display areas or tiles 630A through 660A: a Setups tile 630A, a Calibrations tile 640A, a Qualifications tile 650A, and a Report tile 660A. Selection of one of the tiles 630A through 660A determines what appears in a field 670A displayed in the asset detail screen 600 and, hence, what actions a user may take with respect to the asset. When the user selects the asset to navigate to the asset detail screen 600A, the tablet 130 searches the database 235 by the asset identification information, e.g., asset name or asset ID, for the tile selected in the asset hub 400A to retrieve the configuration (setup) files of the selected asset to display in the field 670A under the "Setups" tile 630A, the "Calibrations" tile 640A, and the "Qualifications" tile 650A, depending on which of the tiles 630A, 640A, and 650A is selected.

Selection of the "Calibrations" tile 640A causes the field 670A to display the available calibrations or calibration verifications in the configuration (setup) file(s) stored in the database 235. A user may select a desired calibration of the sensors connected to the AVS 110 to calibrate the sensors prior to conducting a qualification using the AVS 110 or after a qualification study to verify the sensors' calibrations. During the calibration of sensors or verification of the sensors' calibrations in accordance with a selected configuration, the AVS 110 generates a calibration data file that stores calibration information that includes equipment identification information for the equipment used to calibrate the sensors or verify their calibrations, sensor identification information for the sensors calibrated or verified, asset identification information for the assets with which the sensors are associated, and calibration results. The equipment identification information may include IDs of the equipment. The sensor identification information may include sensor IDs. The calibration information may include indications of which sensors were in or out of calibration, calibration offsets, and which sensors failed calibration. The asset identification information may include asset IDs. The tablet 130 stores the calibration data file in the database 235. Selection of the "Qualifications" tile 650A is discussed below.

Selection of the "Setups" tile 630A causes the field 670A to display the available configuration (setup) file(s) stored in the database 235. A user may select a desired configuration (setup) file to edit it or delete it. In the example illustrated in FIG. 6A, the "Setups" tile 630A is selected. Thus, the field 670A displays the available setups (configurations) for the AVS 110 stored in the database 235, which setups (configurations) may be edited by the user. Illustrated in FIG. 6A is an exemplary setup (configuration) 672A for the asset of FIG. 6A. Next to the setup (configuration) 672A are a link 674A for editing the setup 672A in the database 235 and a link 676A for deleting the available setup 672A for the AVS 110 or another AVS from the database 235. Also included in the field 670A is a link 678A for adding a new setup (configuration) to the database 235 for the AVS 110 or another AVS.

Figure 6B:
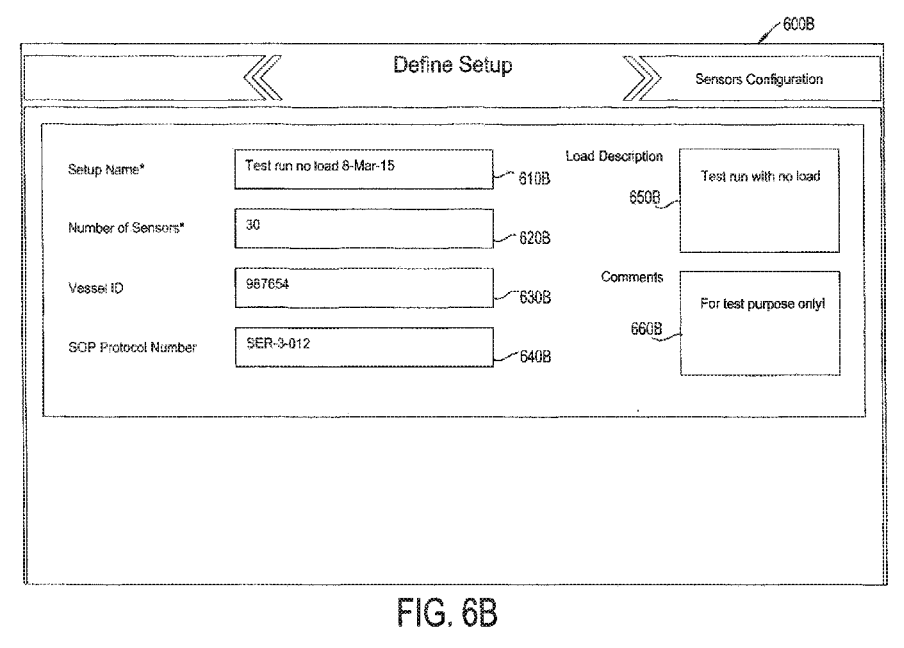

Selection of the link 678A causes the tablet 130 to navigate to a define setup screen 600B, an exemplary embodiment of which is illustrated in FIG. 6B. The define setup screen 600B is rendered by the tablet 130 in the touch-sensitive display 135. The define setup screen 600B comprises various fields 610B through 660B rendered in the define setup screen 600B. The user enters information regarding the new setup (configuration) via the various fields 610B through 660B, such as a name for the setup (configuration) via a text field 610B, the number of sensors associated with the asset via a numeric text field 620B, a vessel ID via the text field 630B, a Standard Operating Procedure (SOP) protocol number, as per ISO standards, via a text field 640B, a load description via a text field 650B, and comments via a text field 660B. In an exemplary embodiment, the fields 610B and 620B are mandatory.

Figure 6C:
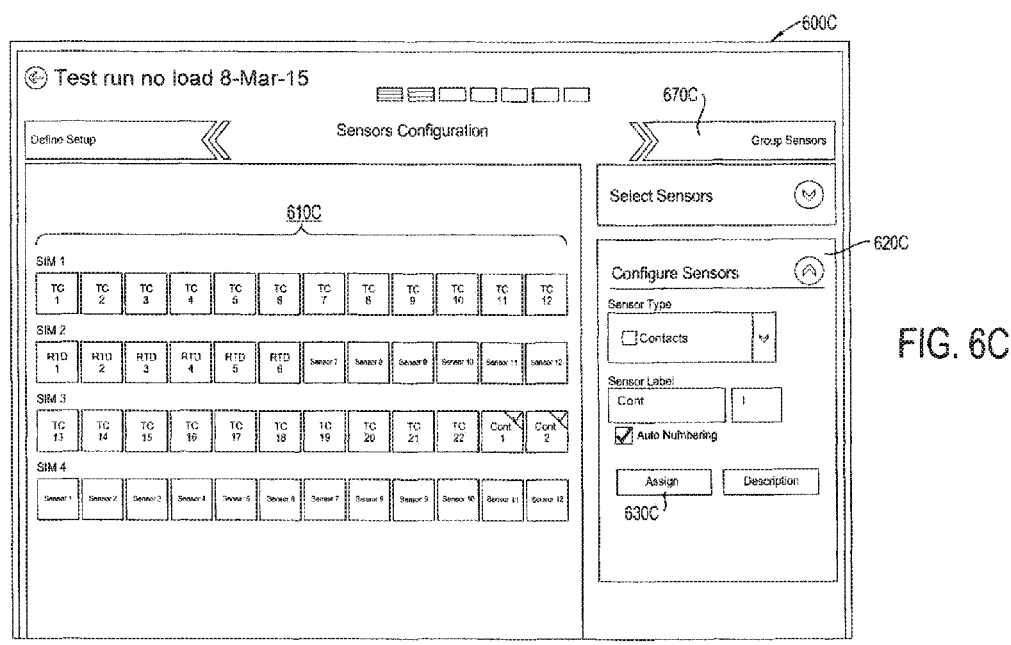
FIG. 6C illustrates a sensors configuration screen rendered in the touch-sensitive display of the tablet computer of FIG. 1A, in accordance with an exemplary embodiment of the present invention.

The new setup screen 600B further comprises a link 670B for configuring the sensors. Selection of the link 670B causes the tablet 130 to navigate to a sensor configuration screen 600C, an exemplary embodiment of which is illustrated in FIG. 6C. The new setup screen 600C is rendered by the tablet 130 in the touch-sensitive display 135. The sensor configuration screen 600C comprises a plurality of tiles 610C for selecting sensors to be configured via fields and drop-down boxes 620C.

The sensor configuration screen 600C further comprises a link 670C for configuring a calibration of the sensors. Calibration is used for calibrating the sensors and for verifying sensor calibration after a qualification study. As described in further detail below, before performing a qualification study, the AVS 110 calibrates connected sensors to correct raw readings to a standard. The AVS 110 stores the differences as offsets in the associated SIMs 214A through 214D. The AVS 110 marks as failed any sensors that fail calibration. After a qualification study, the AVS 110 performs a calibration verification to verify that sensors are still within calibration criteria. If a sensor fails calibration verification, the AVS 110 notes the sensor as failed but stills logs its sensor readings. Calibration offsets are not changed during calibration verification.

Figure 6D:
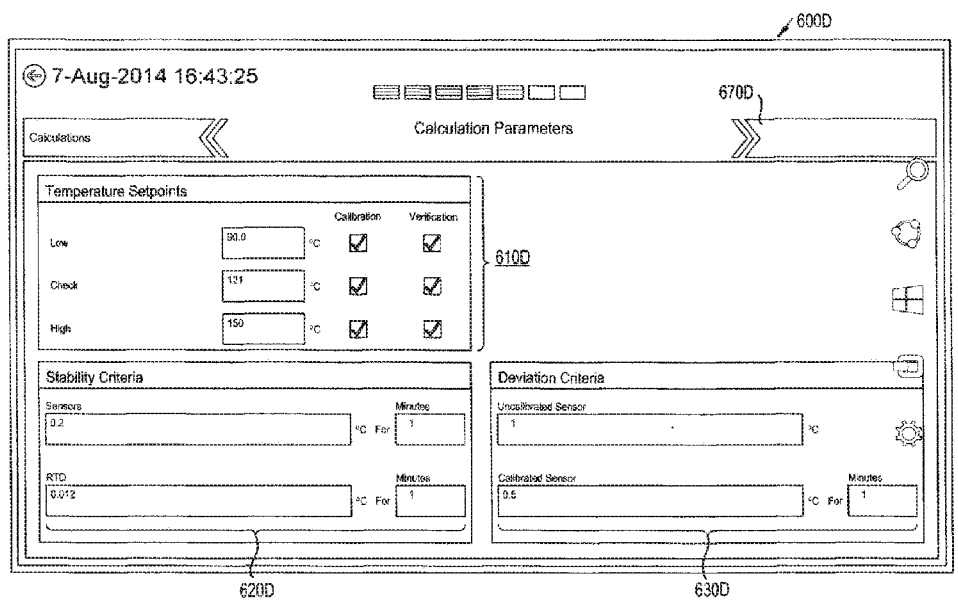
FIG. 6D illustrates a calibration configuration screen rendered in the touch-sensitive display of the tablet computer of FIG. 1A, in accordance with an exemplary embodiment of the present invention.

Selection of the link 670C causes the tablet 130 to navigate to a calibration configuration screen 600D, an exemplary embodiment of which is illustrated in FIG. 6D. The calibration configuration screen 600D is rendered by the tablet 130 in the touch-sensitive display 135. The calibration configuration screen 600D comprises a plurality of input fields 610D, 620D, and 630D for inputting calibration parameters.

The fields 610D are for setting temperature set points. The user can specify a low set point, a high set point, and a check set point via the input fields 610D for both calibration (prior to a qualification study) and verification of a calibration (after a qualification study).

The fields 620D specify stability criteria that specify stability of sensors and IRTDs in terms of temperature variation over a fixed time period. Stability is the amount of change that is acceptable over the fixed time period.

Finally, the fields 630D specify deviation criteria for un-calibrated temperature sensors and deviation criteria for calibrated temperature sensors over a fixed time period. Deviation is the difference in temperature between the sensor values and the temperature standard.

Figure 6E:
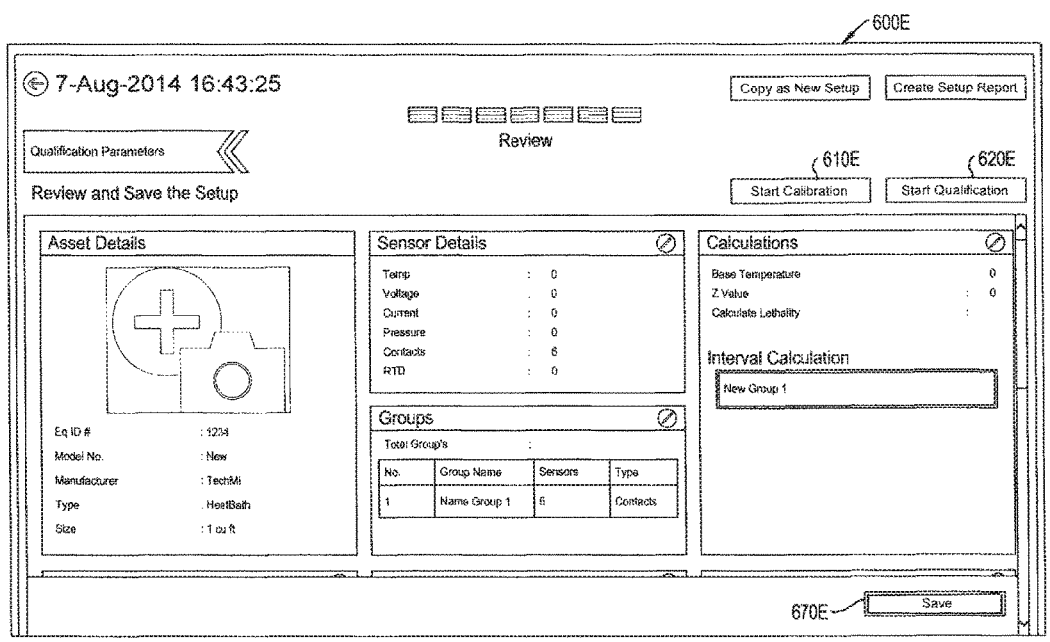
FIG. 6E illustrates a review screen rendered in the touch-sensitive display of the tablet computer of FIG. 1A, in accordance with an exemplary embodiment of the present invention.

The calibration configuration screen 600D further comprises a link 670D for causing the tablet 130 to navigate to a review screen 600E, an exemplary embodiment of which is illustrated in FIG. 6E, in accordance with an exemplary embodiment of the present invention. The review screen 600E is rendered by the tablet 130 in the touch-sensitive display 135. The review screen 600E summarizes the setup, i.e., the information entered into the fields in FIGS. 6B through 6D and the information regarding the asset provided in the fields 610A and 620A in FIG. 6A. The review screen 600E comprises a "Save" link 670E, a selection of which causes the tablet 130 to save the setup, i.e., all of the information contained in the fields in FIGS. 6B through 6D and the information regarding the asset provided in the fields 610A and 620A in FIG. 6A, in a configuration (setup) file (also referred to herein as a "configuration file") in the database 235. Because the asset information 610A and 620A is saved in the configuration (setup) file, the configuration (setup) is linked to the asset. The review screen 600E further comprises a link 610E for starting a calibration or calibration verification, as specified in the configuration (setup) file, and a link 620E for starting a qualification, as specified in the configuration file.

Referring now to FIG. 7, there is illustrated a method, generally designated as 700, for adding a setup (configuration) to the system 100, in accordance with an exemplary embodiment of the present invention. The setup (configuration) is used by the tablet 130, specifically by the processing device 230 thereof, to program the AVS 110 (or another AVS), specifically the processing device 210 thereof, to specify the parameters by which the AVS 110 (or another AVS) collects data from the sensors connected to the SIMs 214A through 214D relating to an asset and to specify the parameters by which the AVS 110 (or another AVS) calibrates the sensors connected to the SIMs 214A through 214D or verifies their calibrations. Selection of the link 678A in the asset detail screen 600A causes the tablet 130 to execute the method 700 to add a setup (configuration) to the system 100 for the asset corresponding to the asset detail screen 600A.

Description of the process is made with reference to FIGS. 6A, 6B, and 6C. The tablet 130 performs the method 700 and may do so when not in communication with the AVS 110, i.e., not docked with the AVS 110 and not in communication with the AVS 110 over Wi-Fi or Ethernet, or when in communication with the AVS 110, i.e., docked with the AVS 110 or in communication with the AVS 110 over Wi-Fi or Ethernet.

Beginning in a Step 710, with the selection of the link 678A in the asset detail screen 600A, the tablet 130 creates a configuration file, stores it in the database 235, and navigates to the new setup screen 600B. The user enters information regarding a data collection portion of the setup (configuration) via the various fields 610B through 660B rendered in the new setup screen 600B. The tablet 130 receives the user-inputted information in a Step 720 and navigates to the sensor configuration screen 600C.

In an exemplary embodiment, in the Step 720, the user enters a name of the setup via a text field 610B, the number of sensors via a text field 620B, an asset ID via a text field 630B, an SOP protocol number via a text field 640B, a description of the load via a text field 650B, and comments via a text field 660B in the new setup screen 600B. The tablet 130 receives all of the entered data collection information in the Step 720 after the user selects a "Sensors Configuration" link 670B.

Continuing with the description of the method 700, the user configures the sensors via the fields and drop-down boxes 620C in the sensor configuration screen 600C, and the tablet 130 receives the sensor configuration information in a Step 730. In an exemplary embodiment, the user enters, via the fields and drop-down boxes 620C, a type of the sensor (thermocouples, RTD, 0-10 v, 4-20 mA), an indication of where the sensor is located in each SIM, at which frequency the sensor will collect data, a text description of the sensor, events instructions (e.g., a command to start collecting data when sensor #10 reaches 50 C), calculation parameters (when to calculate lethality and parameters of lethality calculations, such as base temperature, Z value, and D Value), all of which inputted information forms sensor configuration information. The tablet 130 receives all of the entered sensor configuration information in the Step 730 after the user selects the "Assign" link 630C, and the tablet 130 navigates to the calibration configuration screen 600D.

Continuing with the description of the method 700, the user enters the calibration and verification portion of the setup (configuration) via the fields 610D through 630D in the screen 600D, and the tablet 130 receives the calibration and verification configuration information in a Step 740. In an exemplary embodiment, the user enters temperature set points for calibration and verification via the input fields 610D, stability criteria via the input fields 620D, and deviation criteria via the input fields 630D, all of which inputted information forms the calibration and verification configuration information. The tablet 130 receives all of the entered information in the Step 740 after the user selects the link 670D and navigates to the review screen 600E.

In a Step 750, upon receiving a selection of the link 670E by a user, the tablet 130 stores all of the information received in the Step 720 (data collection information), in the Step 730 (sensor configuration information), and in the Step 740 (calibration and verification configuration information) in the configuration (setup) file in the database 235. Thus, the configuration (setup) file comprises data collection information, sensor configuration information, and calibration configuration information. In a Step 750, the tablet 130 links the information in the configuration (setup) file to the asset corresponding to the asset detail screen 600A. To link the configuration (setup) file to the asset, the tablet 130 stores information regarding the asset previously provided by a user using the new asset detail screen, such as the screen 400B, displayed in the fields 610A and 620A in the asset detail screen 600A in the configuration (setup) file for the asset in the database 235. As described above, this information includes asset identification information, such as the asset ID and the asset name, asset description information, such as the asset type (e.g., heat bath, sterilizer, etc.), the model, the size (in liters, cubic cm, etc.), the manufacturer, the location where the asset is kept, the description of the asset (user-supplied description), asset images (up to three images), and wiring overlay diagrams (images of the inside of the asset showing where sensors will be put to monitor conditions, such as temperature, pressure, etc.) of the asset. The method 700 terminates in a Step 760.

With reference again to FIG. 3, selection of the tile 340 by the user causes the tablet 130 to navigate to an equipment hub 800A, an exemplary embodiment of which is illustrated in FIG. 8A. The equipment hub 800A is rendered by the tablet 130 in the touch-sensitive display 135.

The equipment hub 800A comprises a plurality of user-selectable tiles 810A through 860A, each corresponding to a unique piece of equipment. The tiles 810A through 830A correspond to AVSs; the tile 840A corresponds to an IRTD; the tile 850A corresponds to a bath; and the tile 860A corresponds to the validator (AVS) 110. The tablet 130 retrieves the records of equipment from the database 235 and displays the equipment serial number from each retrieved record as a tile in the equipment hub 800A. As used herein, "equipment" refers, for example, to any equipment, such as an IRTD or a calibration bath, that calibrates sensors attached to an AVS or to any equipment that facilitates collection of data by the SIM cards 214A through 214D, such as AVSs and data loggers. A calibration is performed by appropriate equipment to ensure that the AVS 110 and the sensors attached to it through the SIMs 214A through 214D are within a range of acceptable accuracy. For a system, such as the system 100, to work in acceptable condition, all pieces of equipment that are associated with the AVS 110 and the AVS 110 itself should have valid calibrations, i.e., not be due or past due for calibration. Each piece of equipment has a calibration due date specifying a date before which it should be calibrated.

Selection of one of the tiles 810A through 860A by a user causes the tablet 130 to navigate to an equipment detail screen for the piece of equipment corresponding to the selected tile 810A through 860A. The equipment hub 800A further comprises a link 870A for adding a piece of equipment to the system 100.

Figure 8B:
FIG. 8B illustrates a new equipment screen rendered in the touch-sensitive display of the tablet computer of FIG. 1A, in accordance with an exemplary embodiment of the present invention.

Selection of the link 870A causes the tablet 130 to navigate to a new equipment detail screen 800B, an exemplary embodiment of which is illustrated in FIG. 8B. The new equipment detail screen 800B is rendered by the table 130 in the touch-sensitive display 135. The new equipment detail screen 800B comprises various fields 810B through 850B rendered in the new equipment detail screen 800B. Specifically included in the new equipment detail screen 800B is a text field 810B for entering a serial number, a calendar selection field 820B for entering the date the piece of equipment was last calibrated, a text field 830B for entering a model number, a text field 840B for entering a type for the piece of equipment, and a calendar selection field 850B for entering the date the piece of equipment is to be calibrated. The user enters information regarding the new equipment via the various fields 810B through 850B, and the tablet 130 stores the entered information in a record in the database 235 for the new piece of equipment. In an exemplary embodiment, all of the fields 810B through 850B are mandatory.

Referring now to FIG. 9, there is illustrated a method, generally designated as 900, for adding a piece of equipment to the system 100, in accordance with an exemplary embodiment of the present invention. Selection of the link 870A in the equipment hub 800A by a user causes the tablet 130 to execute the method 900.

Description of the method 900 is made with reference to FIGS. 8A and 8B. The tablet 130 performs the method 900 and may do so when not in communication with the AVS 110, i.e., not docked with the AVS 110 and not in communication with the AVS 110 over Wi-Fi or Ethernet, or when in communication with the AVS 110, i.e., docked with the AVS 110 or in communication with the AVS 110 over Wi-Fi or Ethernet.

Beginning in a Step 910, after selection of the link 870A in the equipment hub 800A, the tablet 130, specifically the processing device 230 thereof, adds a record in the database 235 for the new piece of equipment. The method 900 continues to a Step 920 in which the tablet 130 creates a unique equipment ID (also referred to herein as an "equipment serial number") for the new piece of equipment, stores it in the database 235 in the record for the new piece of equipment, and navigates to the new equipment detail screen 800B. The user enters equipment information (equipment identification information and equipment detail information) via the various fields and drop-down boxes 810B through 850B rendered in the new equipment detail screen 800B, which the tablet 130 receives in a Step 830. In an exemplary embodiment, the user enters equipment identification information, such as a serial number, i.e., an alphanumeric ID, via a text field 810B, and equipment detail information, such as a last date of calibration of the equipment in a calendar selection field 820B, an alphanumeric model designation in a text field 830B, a designation of a type of the equipment in a drop down box 840B, and a calibration due date in a calendar selection field 850B. The tablet 130 receives all of the selected and entered information in the Step 930. After the user selects a "Save" button 860B, the processing device 230 of the tablet 130 stores the received information in the record of the new piece of equipment in the database 235, Step 940. The user may cancel the addition of the new asset at any time by selecting a "Cancel" button 870B. The method 800 terminates in a Step 950.

Figure 10A:
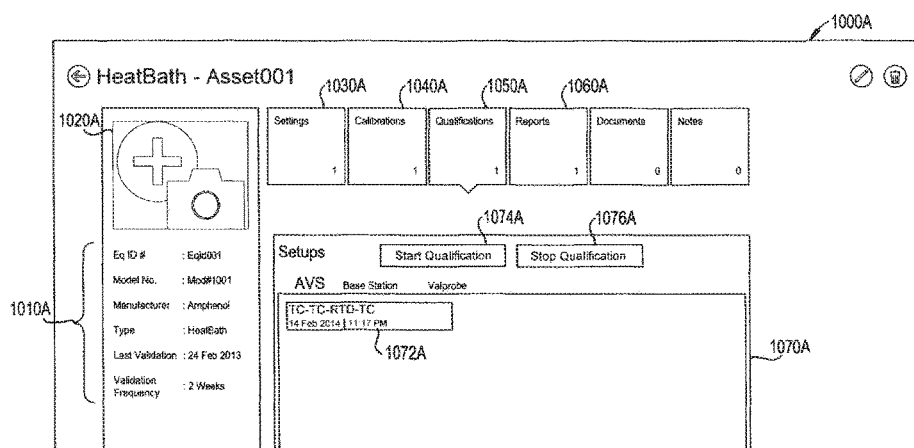
FIG. 10A illustrates an asset detail screen rendered in the touch-sensitive display of the tablet computer of FIG. 1A and, specifically, a qualification hub displayed therein, in accordance with an exemplary embodiment of the present invention.

Referring now to FIG. 10A, there is illustrated another asset detail screen, generally designated as 1000A, for an asset, in accordance with an exemplary embodiment of the present invention. The asset detail screen 1000A is rendered by the tablet 130, specifically the processing device 230 thereof, in the touch-sensitive display 135 for a specific asset based on data stored in a record in the database 235 for such asset retrieved from the database 235 based on a user selection of a tile in the asset hub 400A associated with the asset. The tablet 130 locates the record for the asset in the database 235 by searching the database 235 for a record containing asset identification information, e.g., asset name or asset ID, that matches the asset identification information, e.g., asset name or asset ID, displayed in the tile selected in the asset hub 400A. The exemplary asset detail screen illustrated in FIG. 10A is for a sterilizer.

The asset detail screen 1000A has the same format and layout as the asset detail screen 600A. Thus, the asset detail screen 1000A comprises text information 1010A regarding the asset and a picture 1020A of the asset. In the particular example illustrated, the text information includes the following: "Eq ID #: Eqid001," "Model No: Mode101," "Manufacturer: Amphenol," "Type: HeatBath," "Last Validation: 24 Feb. 2015," and "Validation Frequency: 2 Weeks." This information is contained in the record for the selected asset retrieved from the database 235 by the tablet 130.

Disposed at the top of the asset detail screen 1000A is a plurality of user-selectable display areas or tiles 1030A through 1060A: a Setups tile 1030A, a Calibrations tile 1040A, a Qualifications tile 1050A, and a Report tile 1060A. Selection of one of the tiles 1030A through 1060A determines what appears in a field 1070A displayed in the asset detail screen 1000 and, hence, what actions a user may take with respect to the asset. In the example illustrated in FIG. 10A, the "Qualifications" tile 1050A is selected. Thus, the field 1070A displays the available setups (configurations) that may be performed by the AVS 110, which setups (configurations) are stored in the database 235 in respective configuration (setup) files. When the user selects the asset to navigate to the asset detail screen 1000A, the tablet 130 searches the database 235 by the asset identification information, e.g., asset name or asset ID, of the tile selected in the asset hub 400A to retrieve the configuration (setup) files having matching asset identification information to display in the field 1070A under the Setups tile 1030A, the Calibrations tile 1040A, and the Qualifications tile 1050A, depending on which of the tiles 1030A, 1040A, and 1050A is selected.

Selection of the tile 1040A, "Calibrations," causes the field 1070A to display the available calibrations or calibration verification set in the configuration (setup) file(s) stored in the database 235. A user may select a desired calibration of the sensors connected to the AVS 110 to calibrate the sensors prior to conducting a qualification using the AVS 110 or after a qualification study to verify the sensors' calibrations. During the calibration of sensors or verification of the sensors' calibrations in accordance with a selected configuration, the AVS 110 generates a calibration data file that stores calibration information that includes equipment identification information for the equipment used to calibrate the sensors or verify their calibrations, sensor identification information for the sensors calibrated or verified, asset identification information for the assets with which the sensors are associated, and calibration results. The equipment identification information may include IDs of the equipment. The sensor identification information may include sensor IDs. The calibration information may include indications of which sensors were in or out of calibration, calibration offsets, and which sensors failed calibration. The asset identification information may include asset IDs. The tablet 130 stores the calibration data file in the database 235.

In the example illustrated in FIG. 10A, the tile 1050A, "Qualifications," is selected. Thus, the field 1070A displays the available qualifications that may be performed, which in the example illustrated is a qualification 1072A. The available qualifications are stored in the database 235 in configuration (setup) files, which configurations (setups) are programmed, for example, under the Setups tile 1030A (or under the Setups tile 630A, discussed above with respect to FIG. 6A). The field 1070A further comprises a link 1074A for starting a selected qualification and a link 1076A for stopping a selected qualification.

Figure 10B:
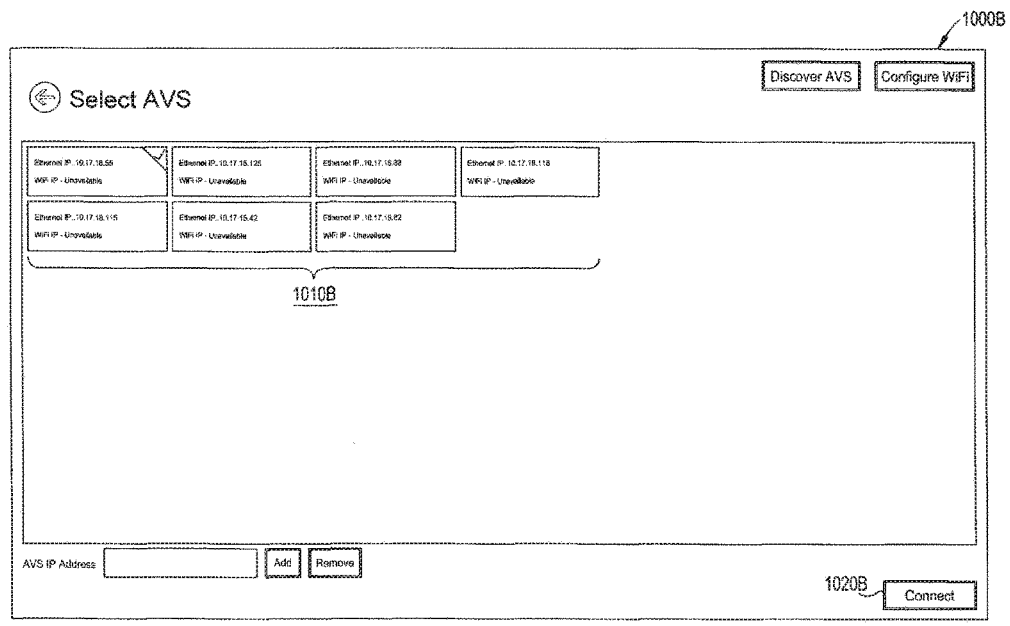
FIG. 10B illustrates an AVS selection screen rendered in the touch-sensitive display of the tablet computer of FIG. 1A, in accordance with an exemplary embodiment of the present invention.

Selection of the qualification 1072A and then of the link 1074A causes the tablet 130 to navigate to an AVS selection screen 1000B, an exemplary embodiment of which is illustrated in FIG. 10B. The AVS selection screen 1000B comprises various user-selectable display areas or tiles 1010B identifying various AVSs in a network with which the tablet 130 is connected. If the tablet 130 is not connected to a network via Wi-Fi or Ethernet, it is docked to the dock 120 of the AVS 110, and the AVS 110 is the only AVS that appears on the AVS selection screen. The user selects one of the tiles and then a "Connect" link 1020B to download the selected configuration (setup) file to the selected AVS and specifically to a storage device of the selected AVS to program the selected AVS to perform the transmitted qualification. In an exemplary embodiment, the selected AVS is the AVS 110, and the tablet 130 downloads the selected configuration (setup) file to the AVS 110 for storage in the storage device 215.

Figure 11:
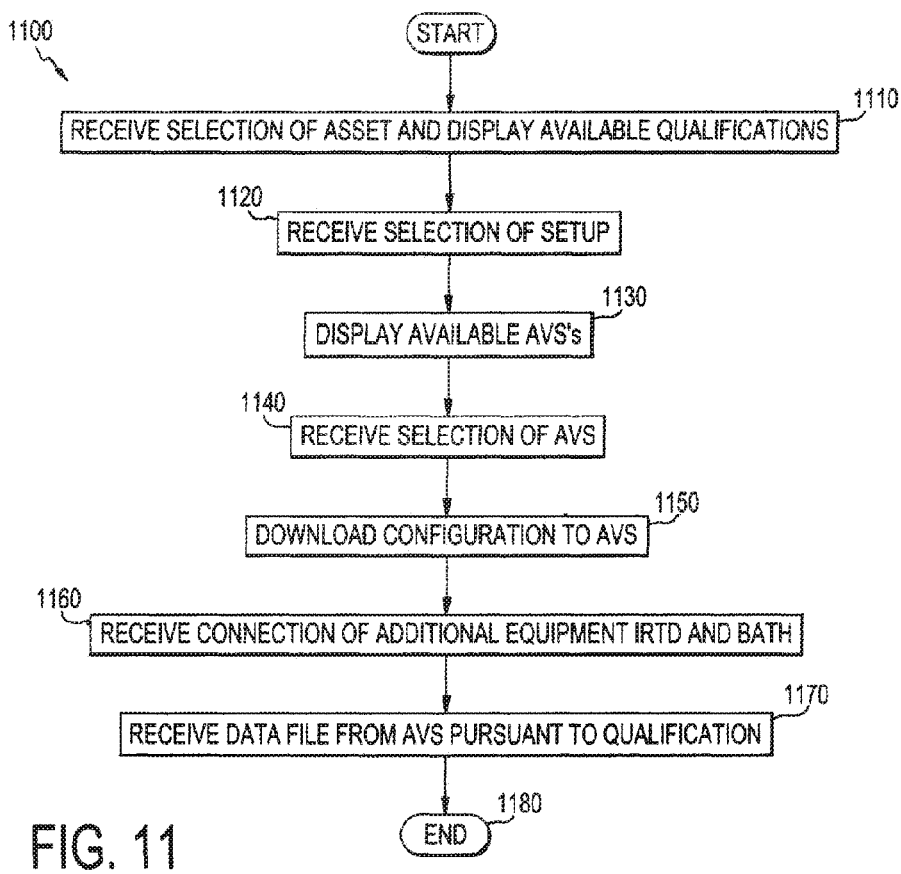
FIG. 11 illustrates a method for programming the AVS of FIG. 1A with a configuration file and generating a data file in response, in accordance with an exemplary embodiment of the present invention.

Referring now to FIG. 11, there is illustrated a method, generally designated as 1100, for performing a qualification procedure, in accordance with an exemplary embodiment of the present invention. Selection of the link 1074A by a user causes the tablet 130, specifically the processing device 230 thereof, to execute the method 1100 for qualifying an asset. Description of the method 1100 is made with reference to FIGS. 4A, 10A, and 10B. The tablet 130 performs the method 1100 and may perform the Steps 1110 and 1120 of the method 1100 when not in communication with the AVS 110, i.e., not docked with the AVS 110 and not in communication with the AVS 110 over Wi-Fi or Ethernet. The Steps 1130 through 1170 are performed by the tablet 130 when in communication with the AVS 110, i.e., docked with the AVS 110 or in communication with the AVS 110 over Wi-Fi or Ethernet.

The method begins with a Step 1110, in which the tablet 130 receives a selection of an asset from an asset hub, such as the asset hub 400A, searches the database 235 for configuration (setup) files having asset identification information, e.g., asset name or asset ID, that matches the asset identification information, e.g., asset name or asset ID, of the tile selected in the asset hub 400A, navigates to the asset detail screen 1000A for the selected asset, and displays the available configurations (setups) specified in the configuration (setup) files for the selected asset in the field 1070A of the asset detail screen 1000A. The method 1100 continues to a Step 1120 in which the tablet 130 receives a selection of a setup that configures a qualification to be performed. The tablet 130 receives such selection upon selection of the field 1072A in the asset detail screen 1000A.

The method 1100 continues to a Step 1130 in which the tablet 130 displays the AVSs that the tablet 130 can see via Wi-Fi or Ethernet for performing qualifications in the AVS selection screen 1000B. The tablet 130 receives a selection of an AVS from a user via the AVS selection screen 1000B, Step 1140. The tablet 130, specifically the processor 215 thereof, then downloads the configuration (setup) file specified by the selected setup to the selected AVS, Step 1150. At this time, the tablet 130 prompts the user to connect additional equipment, such as IRTDs and baths needed to calibrate the sensors associated with the asset corresponding to the asset detail screen 1000A. The tablet 130 receives confirmation from the AVS when the additional equipment has been connected to the AVS 110, Step 1160. At this time, the tablet 110 may be undocked from the AVS 110 or disconnected from it via Wi-Fi or Ethernet.

The configuration file instructs the AVS when to start collecting data and at what intervals to start collecting data. The AVS 110 performs the qualification in accordance with the selected setup, collects data from connected sensors, performs calculations on collected data, stores the collected and calculated data in the storage medium or device 215 in a qualification data file, and transmits the collected and calculated data in a data file to the tablet 130, which receives the data in the Step 1170 after docking with the AVS 110 or connecting to it via Wi-Fi or Ethernet, and stores it in the database 235 in a qualification data file. The qualification data file stores qualification data, which may include any of: (1) configuration file information, such as ID (e.g., name) regarding the configuration (setup) used for performing the qualification, (2) asset information, such as ID, name, description, type, location regarding the asset being qualified, (3) equipment information including equipment ID(s), such as AVS ID in which data was collected, IRTD ID (if connected to the AVS) from calibration data files stored in the database 235, and bath ID (if connected to the AVS) from calibration data files stored in the database 235, (4) sensor information, such as sensor IDs, sensor values, sampling rates, status of sensors (e.g., operation or non-operational), timestamps of samples regarding the asset being qualified; and (5) calculated data (described above). The method 1100 terminates in a Step 1180.

Figure 12:
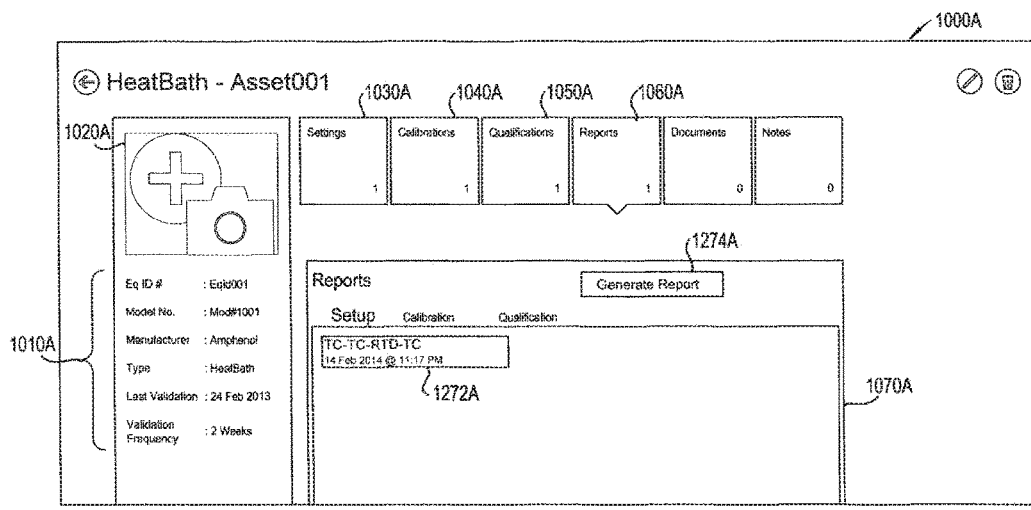
FIG. 12 illustrates an asset detail screen rendered in the touch-sensitive display of the tablet computer of FIG. 1A and, specifically, a report hub displayed therein, in accordance with an exemplary embodiment of the present invention.

Referring now to FIG. 12, there is illustrated another view of the asset detail screen 1000A, in accordance with an exemplary embodiment of the present invention. In FIG. 12, the asset detail screen 1000A, rendered by the tablet 130 in the touch-sensitive display 135, illustrates the field 1070A as rendered when the "Reports" tile 1060A has been selected. As seen in the figure, the field 1070A displays available report templates, which in the example illustrated is a report template 1272A. The field 1070A further comprises a link 1274A for generating a report based on a selected report template. Selection of the link 1274A prompts the tablet 130, specifically the processing device 230 therein, to generate the selected report.

When the user selects the asset on the asset hub 400A to navigate to the asset detail screen 1000A of FIG. 12A, the tablet 130, specifically the processing device 230, searches the database 235 by the asset identification information, e.g., asset name or asset ID, of the tile selected in the asset hub 400A to retrieve the record of the selected asset having matching asset identification information, e.g., the record containing an asset name or asset ID that matches the asset identification information of the selected asset, to display the text information 1010A and the picture 1020A. Furthermore, when the user selects the asset to navigate to the asset detail screen 1000A, the tablet 130 searches the database 235 by the asset identification information, e.g., asset name or asset ID, of the tile selected in the asset hub 400A to retrieve the report templates of the selected asset having matching asset identification information, e.g., the report templates containing an asset name or asset ID that matches the asset identification information of the selected asset, to display in the field 1070A under the "Reports" tile 1060A when it is selected.

Report templates are stored in the database 235. Each report template specifies data from one or more qualification data files that are to be displayed in a report and the format for the display of such data. More specifically, a report template specifies the following information: (1) configuration file information, such as a configuration file ID, sampling rate, sensor details, (2) asset information, such as an asset ID, name, description, type, location, (3) equipment information from calibration data files stored in the database 235, which information may include equipment ID(s), such as AVS ID in which data was collected, IRTD ID (if connected to the AVS), and bath ID (if connected to the AVS), (4) sensor information (e.g., sensor IDs, sensor values, status of sensors, timestamps of samples), and (5) calculated data (described above) stored in one or more qualification data files will be displayed in a report and the format for the display of such data.

Figure 13:
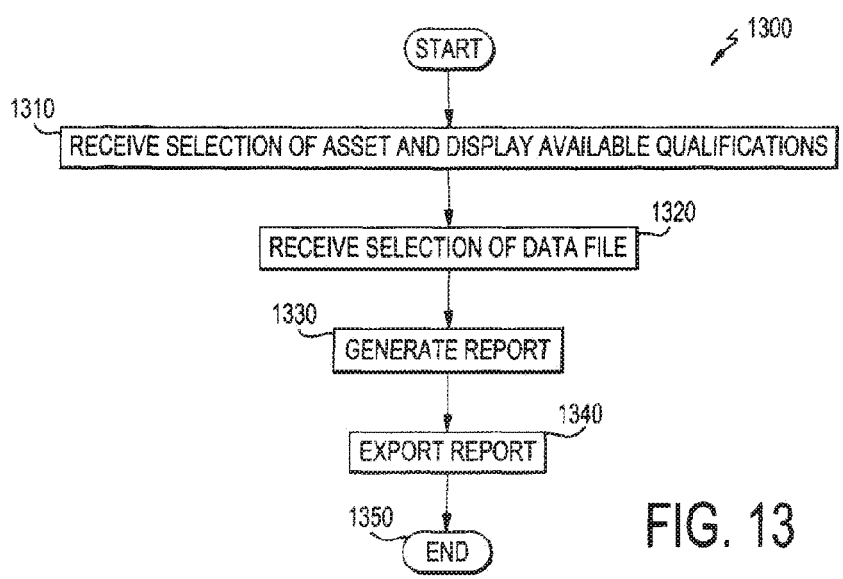
FIG. 13 illustrates a method for generating a report for a selected asset, in accordance with an exemplary embodiment of the present invention.

Referring now to FIG. 13, there is illustrated a method, generally designated as 1300, for generating a report for an asset, in accordance with an exemplary embodiment of the present invention. Description of the method 1300 is made with reference to FIGS. 4A and 12. The tablet 130 performs the method 1300 and may perform the steps of the method 1300 when not in communication with the AVS 110, i.e., not docked with the AVS 110 and not in communication with the AVS 110 over Wi-Fi or Ethernet. It is to be understood that the tablet 130 may also perform the method 1300 when in communication with the AVS 110, i.e., docked with the AVS 110 or in communication with the AVS 110 over Wi-Fi or Ethernet.

The method begins with a Step 1310, in which the tablet 130 receives a selection of an asset from an asset hub, such as by way of a selection of one of the tiles 410 through 440A of the asset hub 400A, searches the database 235 by the asset identification information, e.g., asset name or asset ID, of the tile selected in the asset hub 400A for reports having matching asset identification information, navigates to the asset detail screen for the selected asset, and displays the report templates for the selected asset. The method 1100 continues to a Step 1320 in which the tablet 130 receives a selection of a report template that specifies a report to be generated for the selected asset. The selection is completed by way of the user selecting the link 1274A, which notifies the tablet 130 of the report template selection in the Step 1320. An example of a selection of a report template file is illustrated in FIG. 12 as a selection of the report template 1272A. Selection of the link 1274A by a user causes the tablet 130, specifically the processor thereof, to execute the Steps 1620, 1630, and 1640 of the method 1300 for generating a report for the asset corresponding to the asset detail screen 1000A, e.g., the "Asset001."

The method 1300 continues to a Step 1330, in which the tablet 130 accesses the data stored in the database 235 in one or more qualification data files according to the selected report template and generates the report specified by the selected report template. For example, the tablet 130 parses the qualification data contained in the one or more qualification data files to display all sensor readings, calculated data, audits, and events that were recorded while the qualification study (or studies) that resulted in the qualification data was performed. The tablet 130 outputs the report in a Step 1340, such as by rendering a PDF of the report on the display 135 or saving it in the database 235. The method 1300 ends in a Step 1350.

In an exemplary embodiment, the tablet 130 accesses the database 235 in the Step 1330 to locate qualification data files having asset IDs corresponding to the asset ID of the selected asset. The tablet 130 extracts information from the located qualification data files in accordance with the report template and formats the extracted information for inclusion in a report in accordance with the report template.

As discussed above, the qualification data stored in a qualification file includes any of: (1) configuration file information, such as ID regarding the configuration (setup) used for performing the qualification, (2) asset information, such as ID, name, description, type, location regarding the asset that was qualified, (3) equipment information including equipment ID(s), such as AVS ID in which data was collected, IRTD ID (if connected to the AVS) from calibration data files stored in the database 235, and bath ID (if connected to the AVS) from calibration data files stored in the database 235, (4) sensor information, such as sensor IDs, sensor values, sampling rates, status of sensors (e.g., operation or non-operational), timestamps of samples regarding the asset that was qualified; and (5) calculated data (described above). Thus, the report for the asset includes any of: (1) configuration file information, such as ID (e.g., name), for configurations (setups) that were used to generate the located qualification data files (located in the Step 1330), (2) asset information, such as asset ID, asset name, asset description, asset type, asset location regarding the asset for which the report is to be generated, (3) equipment information, including equipment ID(s), such as AVS ID in which data was collected, IRTD ID (if connected to the AVS) used for calibrating the sensors associated with the asset for which the report is to be generated, and bath ID (if connected to the AVS) used for calibrating the sensors associated with the asset for which the report is to be generated, (4) sensor information, such as sensor IDs, sensor values, sampling rates, status of sensors (e.g., operation or non-operational), timestamps of samples, associated with the asset for which the report is to be generated, and (5) calculated data (described above), all of which information is extracted by the tablet 130 from the one or more located qualification data files.

A user runs a report for an asset to see that the asset is still performing as per specifications. For example, if the asset is an autoclave, the user may run a report on the autoclave for a specific qualification study to see whether the temperature with the autoclave reached 121.1 C within a given time. Assuming that the autoclave was involved in a plurality of qualification studies, which resulted in a plurality of qualification data files, the report would include (1) configuration file information regarding the configuration (setup) files that governed the plurality of qualification studies, (2) asset information for the autoclave, (3) equipment information regarding the equipment used to calibrate and verify the calibration of the sensors used during the plurality of qualification studies of the autoclave, (4) sensor information collected during the plurality of qualification studies, and (5) calculated data.

The asset-report generation feature of the tablet 130 reports any or all data regarding an asset over one or more qualifications (i.e., one or more qualification studies). It is to be understood that the asset-reporting feature is not limited to just one qualification or just one piece of equipment. Rather, depending on the report template, data from one or more of the qualifications performed on the asset and data regarding one or more of the pieces of equipment used for calibrating or verifying the calibrations of the sensors used during the one or more qualifications of the selected asset may be included in the report for the selected asset. In the asset detail screen (e.g., the asset detail screen 600A or 1000A), the reports for the illustrated asset may be access through the "Reports" tile (e.g., the tile 660A or 1060A). Thus, the tablet 130 provides access to reports through asset details screens so that data concerning such assets are logically accessed by accessing the asset detail screen for the asset.

Processes using assets may include dozens or hundreds of assets. Conventional systems may include dozens or hundreds of reports of qualifications without a way to access the reports for desired qualifications of assets other than by identifying a report by name. The system 100 is advantageous over conventional systems because a report for one or more qualifications of an asset is accessed through the asset detail screen (e.g., the asset detail screen 600A, 1000A), allowing the desired report to be easily found by navigating from the asset hub (e.g., the asset hub 400A) to the asset detail screen for a desired asset (e.g., the asset detail screen 600A, 1000A). Reports are customizable to report data from one or more qualifications for an asset over desired time frames of sensor data, based on time stamps for the sensor data.

Figure 14:
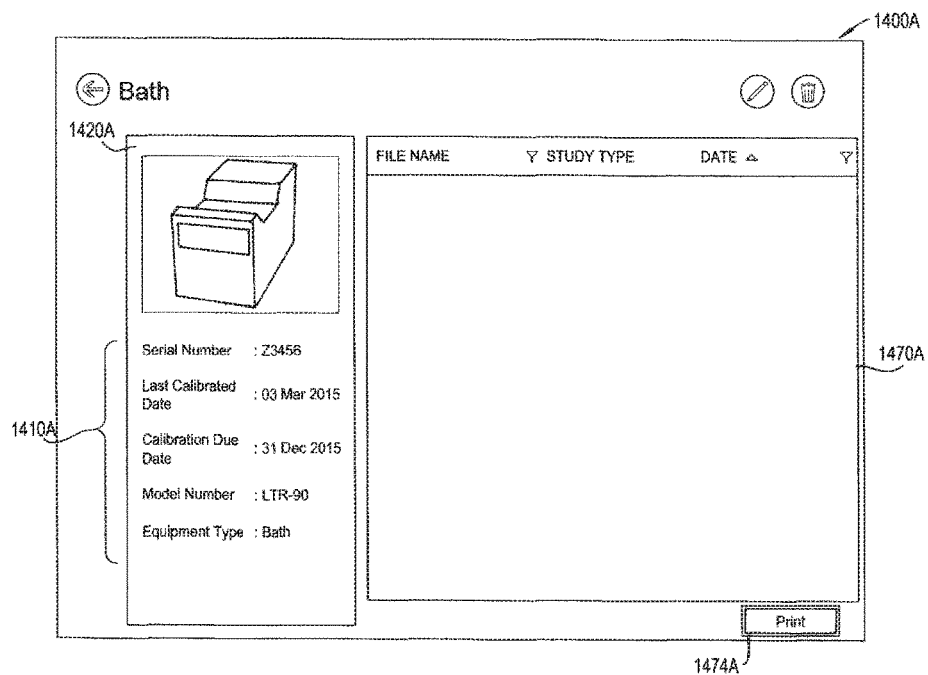
FIG. 14 illustrates an equipment detail screen rendered in the touch-sensitive display of the tablet computer of FIG. 1A, in accordance with an exemplary embodiment of the present invention.

Referring now to FIG. 14, there is illustrated an equipment detail screen, generally designated as 1400A, for a piece of equipment, in accordance with an exemplary embodiment of the present invention. The equipment detail screen 1400A is rendered by the tablet 130, specifically by the processing device 230 thereof, in the touch-sensitive display 135 for a specific piece of equipment based on data stored in a record in the database for such piece of equipment and retrieved from the database 235 based on the user-selection of a tile in the equipment hub 800A associated with the piece of equipment. The equipment detail screen 1400A comprises text information 1410A regarding the piece of equipment and a picture 1420A of the piece of equipment. Disposed on the right half of the screen 1400A is a field 1470A displaying all of the data files that have been generated in qualifications that used the piece of equipment. In the particular example illustrated, the text information includes the following: "Serial number: Z3456," "Last Calibrated Date: 3 Mar. 2015," "Calibration Due Date: 31 Dec. 2015," "Model Number: LTR-90," and "Equipment Type: Bath." This information is contained in the record for the selected piece of equipment retrieved from the database 235 by the tablet 130.

When the user selects the piece of equipment on the equipment hub 800A to navigate to the equipment detail screen 1400A of FIG. 14A, the tablet 130, specifically the processing device 230 thereof, searches the database 235 by the equipment identification information, e.g., equipment serial number, of the tile selected in the equipment hub 800A to retrieve the record of the selected equipment having matching equipment identification information, e.g., the record containing an equipment serial number that matches the equipment serial number of the selected asset, to display the text information 1410A and the picture 1420A.

Furthermore, when the user selects the piece of equipment to navigate to the equipment detail screen 1400A, the tablet 130 searches the database 235 by the equipment identification information, e.g., equipment serial number, of the tile selected in the equipment hub 800A to retrieve all qualification data files (having matching equipment identification information) for which the selected piece of equipment was used to display such located qualification data files in the field 1470A. The field 1470A provides a list of the names of the qualification data files, the type of the qualification documented in each of the qualification data files, and the date on which the qualification documented in each of the qualification data files was conducted. The tablet 130 is able to identify the relevant qualification data files because, as discussed above, the AVS 130, when running a qualification, inserts equipment identification information into the qualification data file specifying the equipment that was used to calibrate the sensors used during the qualification study, the equipment that was used to perform the qualification study, e.g., the AVS 130, and the equipment that was used to verify the sensor calibrations after the qualification study. The equipment detail screen 1400A comprises a link 1474A for prompting the tablet 130 to generate a report listing all of the qualification data files listed in the field 1470A. In an exemplary embodiment, this report is created by the tablet 130 as a PDF file, which may be displayed in the display 135 thereof or stored in the database 230.

Figure 15:
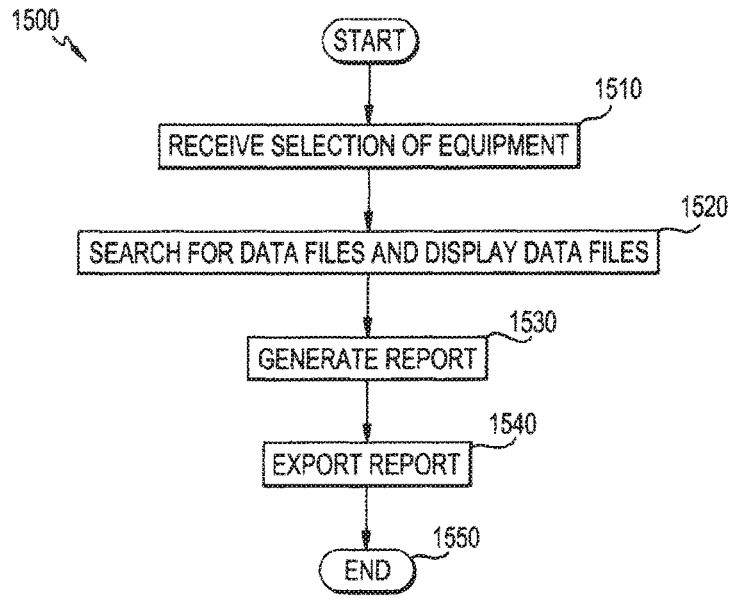
FIG. 15 illustrates a method for generating a report for a selected piece of equipment, in accordance with an exemplary embodiment of the present invention.

Referring now to FIG. 15, there is illustrated a method, generally designated as 1500, for generating a report for a piece of equipment, in accordance with an exemplary embodiment of the present invention. Description of the method 1500 is made with reference to FIGS. 8A and 10A. The tablet 130 performs the method 1500 and may perform the steps of the method 1500 when not in communication with the AVS 110, i.e., not docked with the AVS 110 and not in communication with the AVS 110 over Wi-Fi or Ethernet. It is to be understood that the tablet 130 may also perform the method 1500 when in communication with the AVS 110, i.e., docked with the AVS 110 or in communication with the AVS 110 over Wi-Fi or Ethernet.

The method begins with a Step 1510, in which the tablet 130 receives a selection of a piece of equipment from an equipment hub, such as by way of a selection of one of the tiles 810A through 860A of the equipment hub 800A. The method 1500 continues to a Step 1520 in which the tablet 130 searches the database 235 by the equipment identification information, e.g., equipment serial number, of the tile selected in the equipment hub 800A for data files having matching equipment identification information, which data files were generated from qualifications that used the selected piece of equipment and displays such files in the field 1470A. The tablet 130 searches the database 235 for all qualification data files having stored therein equipment identification information that matches the equipment identification information for the tile selected in the equipment hub 800A. The tablet 130 lists all of such qualification data files in the field 1470A, listing them by the names of the files, the types of the qualifications, and the dates on which the qualification data files were created. In a Step 1530, in response to receiving a user selection of the link 1474A, the tablet 130 generates a report on all of the qualification data files corresponding to the selected piece of equipment. The tablet 130 outputs the report in a Step 1540, such as rendering a PDF of the report on the display 135 or saving it in the database 235. The method 1300 ends in a Step 1350.

As discussed above, the qualification data stored in a qualification file includes any of: (1) configuration file information, such as ID regarding the configuration (setup) used for performing the qualification, (2) asset information, such as ID, name, description, type, location regarding the asset that was qualified, (3) equipment information including equipment ID(s), such as AVS ID in which data was collected, IRTD ID (if connected to the AVS) from calibration data files stored in the database 235, and bath ID (if connected to the AVS) from calibration data files stored in the database 235, (4) sensor information, such as sensor IDs, sensor values, sampling rates, status of sensors (e.g., operation or non-operational), timestamps of samples regarding the asset that was qualified; and (5) calculated data (described above).

Thus, the report for the piece of equipment includes any of: (1) configuration file information, such as ID (e.g., name), for configurations (setups) that were used to generate the located qualification data files (located in the Step 1330), (2) asset information, such as asset ID, asset name, asset description, asset type, asset location regarding the assets associated the piece of equipment, (3) equipment information, including equipment ID(s), regarding the piece of equipment for which the report is to be generated, (3) sensor information, such as sensor IDs, sensor values, sampling rates, status of sensors (e.g., operation or non-operational), timestamps of samples, associated with the asset, and (4) calculated data (described above), all of which information is extracted by the tablet 130 from the one or more located qualification data files. The calculated data may include processed sensor data events that occurred during the qualification study and an audit trail, specifying, for example, power failures, when a SIM was connected or disconnected from the AVS, etc.

Figure 16:
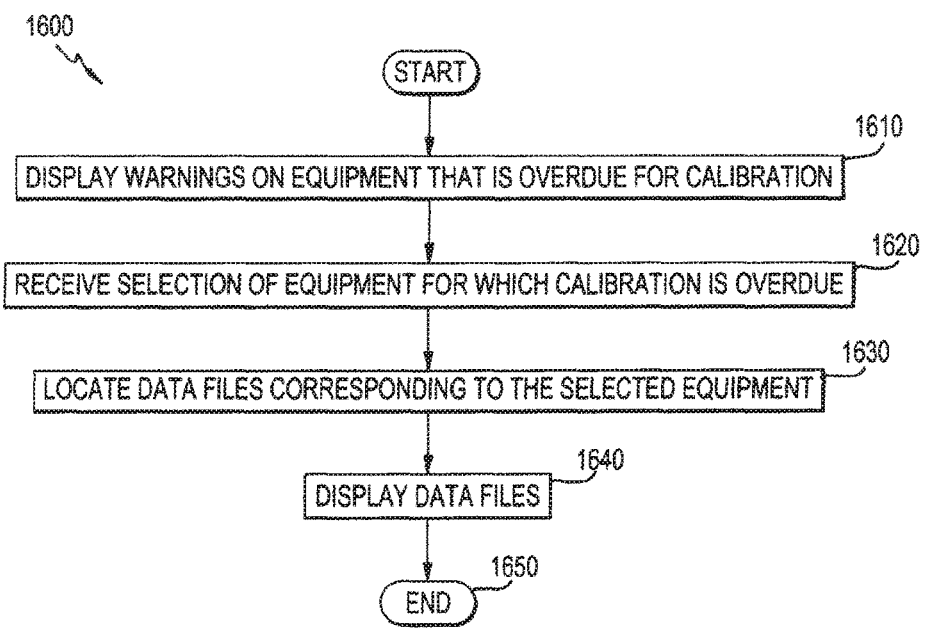
FIG. 16 illustrates a method for generating a report regarding data collected by equipment requiring calibration, in accordance with an exemplary embodiment of the present invention.
Figure 17A:
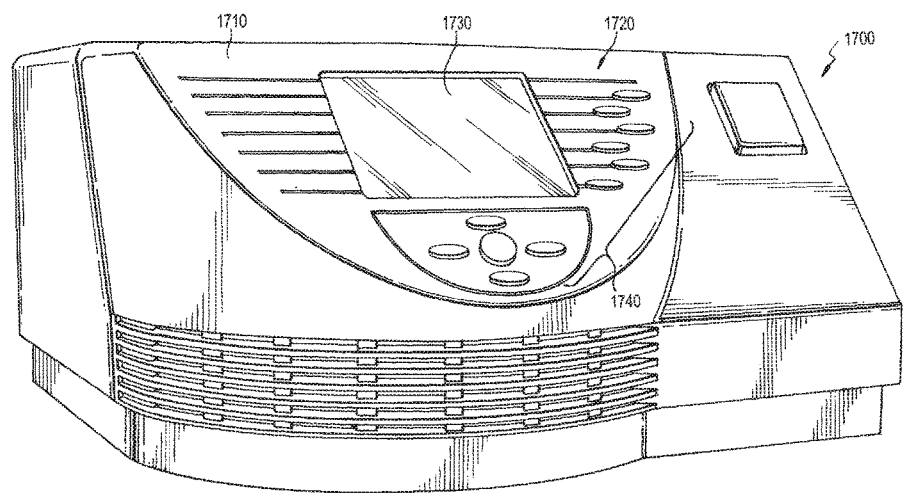
Figure 17B:
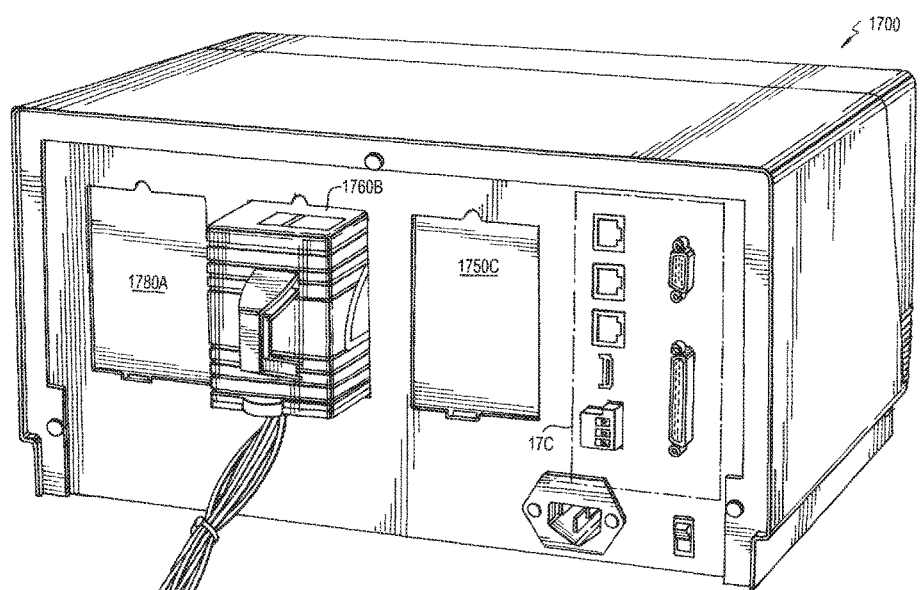

Referring now to FIG. 16, there is illustrated a method, generally designated as 1600, for displaying a warning regarding data collected by equipment requiring calibration, in accordance with an exemplary embodiment of the present invention. The method begins with a Step 1610, in which the tablet 130, specifically the processing device 230 thereof, searches the database 235 by the equipment identification information, e.g., equipment serial number, for each tile in the equipment hub 800A to retrieve every record for all pieces of equipment having matching equipment identification information, identifies in the located records the due dates for calibration for all pieces of equipment to determine whether they are due or overdue for calibration (by comparing the due date to the present date), and displays warnings on the equipment hub 800A tiles 810A through 860A corresponding to equipment that is due and/or overdue for calibration. Examples of warnings are illustrated in FIG. 8A and include a warning 815A for a first AVS corresponding to the tile 810A and a warning 825A for a second AVS corresponding to the tile 820A.

Continuing with the method 1600, the user may select any one of the tiles 810A through 860A in the equipment hub 800A when it is displayed in the display 135 of the tablet 130, and the tablet 130 receives such selection, Step 1620. The tablet 130 then navigates to the equipment detail screen for the piece of equipment corresponding to the selected tile 810A through 860A. The tablet 130, specifically the processing device 230 thereof, then searches for all qualification data files corresponding to the selected equipment, i.e., all data files that were generated in qualifications involving the selected equipment, Step 1630 by searching the database 235 by the equipment identification information, e.g., equipment serial number, for the tile selected in the equipment hub 800A to locate all qualification data files comprising such equipment identification information. The tablet 130 displays the located qualification data files, Step 1640, as described above with respect to FIGS. 14 and 15 to assist the user in identifying all the qualifications and assets which may be under risk as a result of the equipment being past-due for calibration. These files are displayed in the field 1470A of the equipment detail screen 1400A in the Step 1640 so that the user may review them to determine which qualifications and, therefore, which assets are at risk of containing bad data, e.g., sensor readings from sensors that may have incorrect calibrations on account of the equipment used to calibrate them or verify their calibrations being past-due for calibration. The method 1600 ends in a Step 1650. The user may then send the selected piece of equipment for calibration and take remedial action regarding the assets that were the subject of qualifications in which the equipment was used for data collection, calibration, or verification of calibration.

In one exemplary embodiment, the tablet 130, specifically the processing device 230 thereof, performs the method 1600 each time the tablet 130 navigates to the equipment hub 800A. Thus, the user of the tablet 130 accesses the equipment hub 800A to cause the tablet 130 to perform the method 1600 and to view the results thereof in the tiles 810A through 860A. In another exemplary embodiment, the tablet 130 performs the method 1600 on a periodic basis, e.g., once a day, and displays the results in the tiles 810A through 860A and, optionally, sounds an alarm when a piece of equipment is past its calibration due date.

It is noted that communication occurs between the respective devices including the tablet 130, devices 240, AVS 110, devices 250, and SIM 214. Communication can occur by direct wired connection of respective devices, by wireless communication, and/or by using a unique identification code (ID) assigned to each of those respective devices. The IDs can be stored in memory or at the processing devices 210 and/or 230.

Various terms and features discussed herein are provided as non-limiting, illustrative embodiments, and other suitable alternatives can be utilized within the spirit and scope of the invention. For example, a "field" may be any computer-display element, such as a text box, drop-down box, radio-button input, etc., for receiving a user input. A "link" may be any computer-display element, the selection of which causes a computer display to navigate from one window, tab, or frame to another window, tab, or frame. Links may be rendered as buttons, text, or other user-clickable or touch-sensitive display elements on a computer device display. A "hub" refers to a collection of one or more links to other windows, tabs, or frames. For example, an asset hub provides links to one or more windows for respective one or more assets, and an equipment hub provides links to one or more windows for respective one or more pieces of equipment. A "tile" may be any user-clickable or touch-sensitive computer-display element rendered as a shape having text within its boundaries. Any portion of the shape or the text within the shape may be user-clickable or touch-sensitive.

The description and drawings of the present invention provided in the paper should be considered as illustrative only of the principles of the invention. The invention may be configured in a variety of ways and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A system for qualifying a process in a facility, the system comprising:
 a validation system comprising:
  a storage device;
  a processing device; and
  one or more sensor input modules each connected to one or more sensors; and
 a portable computer device comprising:
  a storage device comprising a database comprising a configuration file for configuring the validation system to perform a qualification of an asset, said configuration file comprised of calibration data associated with the one or more sensors; and
  a processing device configured to transmit the configuration file to the validation system for storage in the storage device of the validation system,
 wherein the processing device of the validation system is configured to load the configuration file stored in the storage device of the validation system to perform calibration of the one or more sensors and the qualification of the asset based on the loaded configuration file.

2. The system of claim 1, wherein the portable computer device further comprises an interface for receiving inputs from a user specifying a configuration of the qualification of the asset, wherein the processing device of the portable computer device receives the inputs and stores the configuration of the qualification of the asset in the configuration file in the database of the storage device of the portable computer device.

3. The system of claim 2, wherein the portable computer device further comprises an interface for programming the validation system, the interface comprising a user selectable input for selecting the configuration file to be sent to the valuation system.

4. The system of claim 1, wherein the configuration file further comprises information identifying the asset.

5. The system of claim 4, wherein the information identifying the asset comprises an identification code for the asset and an indication of a type of the asset.

6. The system of claim 1, further comprising one or more sensors connected to the validation system, wherein the configuration file further comprises information identifying the one or more sensors.

7. The system of claim 6, wherein the database further comprises a qualification data file comprising the information identifying the one or more sensors, data collected by the one or more sensors regarding the asset during a qualification study, and information identifying the asset.

8. The system of claim 7, wherein the portable computer device further comprises an interface for displaying the identification of the asset, the interface providing a user selectable input that when selected by the user causes the processing device of the portable computer system to generate a report on the asset, the report comprising the data collected by the one or more sensors regarding the asset in the qualification data file.

9. The system of claim 8, wherein the report further comprises the information identifying the one or more sensors and the information identifying the asset.

10. The system of claim 6, wherein the database further comprises a plurality of qualification data files, each comprising the information identifying the one or more sensors, data collected by the one or more sensors regarding the asset during a qualification study, and information identifying the asset.

11. The system of claim 10, wherein the portable computer device further comprises an interface for displaying the identification of the asset, the interface providing a user selectable input that when selected by the user causes the processing device of the portable computer system to generate a report on the asset, the report comprising the data collected by the one or more sensors regarding the asset in each of the plurality of qualification data files.

12. The system of claim 11, wherein the report further comprises the information identifying the one or more sensors and the information identifying the asset.

13. The system of claim 10, further comprising one or more pieces of equipment, wherein the database further comprises a plurality of equipment records, each equipment record comprising identification information.

14. The system of claim 13, wherein each of the plurality of qualification data files comprises identification information for each of the one or more pieces of equipment.

15. The system of claim 14, wherein the information regarding each of the one or more pieces of equipment in each of the plurality of qualification data files comprises an identification of the one of the one or more pieces of equipment and an indication of a type of the one of the one or more pieces of equipment.

16. The system of claim 14, wherein the interface is further configured for displaying the identification of the one or more pieces of equipment, the interface further providing a user selectable input for each of the one or more pieces of equipment, wherein selection of the input of one of the one or more pieces of equipment causes the processing device of the portable computer system to generate a report on the one of the one or more pieces of equipment, the report comprising the data collected by the one or more sensors regarding the one of the one or more pieces of equipment in each of the plurality of qualification data files.

17. The system of claim 16, wherein the report further comprises the information identifying the one or more sensors and the information identifying the one of the one or more pieces of equipment.

18. The system of claim 14, wherein the user selectable input further causes the processing device of the portable computing system to:
search the database for qualification data files regarding qualifications in which the one of the one or more pieces of equipment was used; and
generate a report specifying the qualification data files for qualifications in which the one of the one or more pieces of equipment was used and assets associated with the specified data files.

19. The system of claim 13, wherein each the plurality of equipment records comprises an indication of a date of calibration of the piece of equipment identified by the identification information of the each of the plurality of equipment records.

20. The system of claim 19, wherein the processing device of the portable computer device further comprises an interface configured to display information regarding each of the one or more pieces of equipment and a data of last calibration for each of the one or more pieces of equipment.

21. A method for qualifying a process in a facility, the method comprising:
storing a configuration file in a database on a non-transitory machine-readable storage medium of a portable computer device, the configuration file for configuring a validation system to perform a qualification of an asset, said configuration file comprised of calibration data associated with the one or more sensors;
transmitting the configuration file to the validation system for storage in a non-transitory machine-readable storage medium of the validation system;
loading and executing the configuration file stored in the non-transitory machine-readable storage medium of the validation system to cause a processing device of the validation system to perform a calibration of one or more sensors and qualification of the asset based on the loaded configuration file; and
receiving and storing data from a plurality of sensors communicating with the validation system during the qualification.

22. The method of claim 21, further comprising:
receiving inputs from a user via an interface of the portable computer device, the inputs specifying a configuration for the qualification of the asset;
storing the configuration of the qualification of the asset in the configuration file of the record of the asset in the database.

23. The method of claim 22, further comprising:
displaying on the portable computer device one or more indications of one or more respective valuation systems that are available for conducting a qualification study; and
receiving a user selection of one of the one or more indications corresponding to one of the one or more respective valuation systems for sending the configuration file to the one of the one or more respective valuation systems.

24. The method of claim 21, further comprising storing information regarding the asset in the database on the tangible computer readable storage medium of the portable computer device.

25. The method of claim 24, wherein the information regarding the asset comprises an identification of the asset and an indication of a type of the asset.

26. The method of claim 25, wherein the information regarding the asset further comprises data regarding the asset collected during a plurality of qualifications of the asset.

27. The method of claim 26, further comprising:
displaying the identification of the asset and the indication of the type of the asset on an interface of the portable computer device;
providing a user selectable input on the portable computer device for generating a report of the asset;
receiving a selection of the user-selectable input by a user for generating the report; and
generating the report on the asset, the report comprising the data regarding the asset collected during the plurality of qualifications of the asset.

28. The method of claim 21, further comprising storing in the database of the tangible computer readable storage medium of the portable computer device information regarding one or more pieces of equipment.

29. The method of claim 28, wherein the information regarding the one or more pieces of equipment comprises an identification of each of the one or more pieces of equipment and an indication of a type of each of the one or more pieces of equipment.

30. The method of claim 29, further comprising:
displaying the identification of each of the one or more pieces of equipment and the indication of the type of each of the one or more pieces of equipment on an interface of the portable computer device;

providing a user selectable input on the portable computer device for selecting one of the one or more pieces of equipment for generating a report of the selected one of the one or more pieces of equipment;

receiving a selection of the user-selectable input by a user for generating the report; and generating a report specifying qualification data files for qualifications in which the selected one of the one or more pieces of equipment was used.

31. The method of claim 28, wherein the information regarding the one or more pieces of equipment further comprises an indication of a date of calibration regarding each of the one or more pieces of equipment.

32. The method of claim 31, further comprising displaying, by the personal computer device, the information regarding each of the one or more pieces of equipment and a date of last calibration for each of the one or more pieces of equipment.

* * * * *